United States Patent [19]
Sugikawa et al.

[11] Patent Number: 5,742,745
[45] Date of Patent: Apr. 21, 1998

[54] COMMUNICATION DEVICE

[75] Inventors: Akihiko Sugikawa; Yasuhiro Morioka; Teruhiko Ukita, all of Tokyo, Japan

[73] Assignee: Kabushiki Kaisha Toshiba, Kawasaki, Japan

[21] Appl. No.: 447,652

[22] Filed: May 23, 1995

[30] Foreign Application Priority Data

May 24, 1994 [JP] Japan .................................. 6-109915
Jan. 20, 1995 [JP] Japan .................................. 7-007460

[51] Int. Cl.$^6$ .................................................. H04L 12/56
[52] U.S. Cl. .................. 395/114; 370/335; 370/200.15
[58] Field of Search ........................... 395/200.12, 114, 395/200.15; 370/226, 235, 60

[56] References Cited

U.S. PATENT DOCUMENTS

| | | | |
|---|---|---|---|
| 5,233,604 | 8/1993 | Ahmadi et al. | 370/60 |
| 5,488,609 | 1/1996 | Hluchyj et al. | 370/84 |
| 5,502,816 | 3/1996 | Gawlick et al. | 395/200.15 |
| 5,506,847 | 4/1996 | Shobatake | 370/60 |
| 5,509,123 | 4/1996 | Dobbins et al. | 395/200.15 |
| 5,521,910 | 5/1996 | Matthews | 370/54 |
| 5,526,349 | 6/1996 | Diaz et al. | 370/58.1 |
| 5,581,703 | 12/1996 | Baugher et al. | 395/200.06 |

OTHER PUBLICATIONS

The Impact of Emerging Technologies on Military Radio Communications Stephen C. Cook, Nov. 1992, IEEE Region 10 Conference, 408–412.

Translation of QOS Parameters into ATM Performance Parameters in B–ISDN, Jae–il Jung, IEEE 1993 pp. 6c4.1–6c4.8.

Correlation Effect on Per–Stream QoS Parameters of ATM Trassic Superpositions Relevant to Connection Admission Control, Christoph Herrmann, 1993 IEEE, pp. 1027–1031.

*Primary Examiner*—Ayaz R. Sheikh
*Assistant Examiner*—Paul R. Myers
*Attorney, Agent, or Firm*—Finnegan, Henderson, Farabow, Garrett & Dunner, L.L.P.

[57] ABSTRACT

The data processing device 400 of this invention comprises a controller unit 402, a data recorder unit 404, a display unit 406, a data input unit 408 and a communication control unit 410. By transmitting a request for service in a multiple-address way to a plurality of devices on a network and selecting a service providing device, communicability with the service-providing group can be automatically obtained without prior registration of device information in the respective devices or in any specified device. If the service providing device withdraws from the network or a trouble develops in the communication link, a new service providing device is selected from among other communicable devices.

12 Claims, 37 Drawing Sheets

Fig.4

SERVICE TYPE NUMBERS

1 SHARED DATA MANAGEMENT
2 KANA-KANJI CONVERSION
3 ENCYCLOPEDIA
4 SPEECH-CHARACTER CONVERSION
5 LANGUAGE TRANSLATION
⋮
⋮
N SPEECH OUTPUT

Fig.7(a)

| PACKET LENGHT | ADDRESSEE DEVICE ID DATA | TRANSMITTING DEVICE ID DATA | DATA SECTION | CRC |
|---|---|---|---|---|

Fig.7(b)

| PACKET LENGHT | ADDRESSED TO ALL DEVICE | ID NUMBER OF THE DEVICE OF ITS OWN | SERVICE REQUEST DATA | SERVICE TYPE ID DATA | CRC |
|---|---|---|---|---|---|

Fig.7(c)

| PACKET LENGHT | ADDRESSED TO ALL DEVICE | ID NUMBER OF THE DEVICE OF ITS OWN | SERVICE-PROVIDING DEVICE SELECTION DATA | DATA FOR SELECTION | SERVICE REQUESTING DEVICE ID DATA | CRC |
|---|---|---|---|---|---|---|

Fig.7(d)

| PACKET LENGHT | SERVICE-REQUESTING DEVICE ID NUMBER | ID NUMBER OF THE DEVICE OF ITS OWN | SERVICE REQUEST ACCEPTANCE DATA | CRC |
|---|---|---|---|---|

Fig.7(e)

| PACKET LENGHT | SERVICE-REQUESTING DEVICE ID NUMBER | ADDRESS NUMBER OF THE DEVICE OF ITS OWN | SERVICE PROVIDABILITY DATA | DATA FOR SELECTION | DATA FOR SELECTION | CRC |
|---|---|---|---|---|---|---|

Fig. 8

| PACKET LENGHT | GROUP ID DATA | ADDRESSEE DEVICE ID DATA | TRANSMITTING DEVICE ID DATA | DATA SELECTION | CRC |
|---|---|---|---|---|---|

Fig. 9

1  SHARED DATA MANAGEMENT, COMPANY B, DEPT. I ;
   COMPANY B, DEPT. I, SECTION I

2  KANA-KANJI CONVERSION, ALL PERSONNEL

Fig.10(a)

NAME : TARO YAMADA
ADDRESS : OSAKA
ORGANIZATION : COMPANY B, DEPT. I ; COMPANY B, DEPT. I, SECTION I

Fig.10(b)

| PACKET LENGHT | ADDRESSED TO ALL DEVICE | ID NUMBER OF THE DEVICE OF ITS OWN | SERVICE REQUEST DATA | SERVICE TYPE ID NUMBER | USER INFORMATION | CRC |
|---|---|---|---|---|---|---|

Fig.11

| PACKET LENGHT | ADDRESSED TO ALL DEVICE | ID NUMBER OF THE DEVICE OF ITS OWN | CONDITIONAL SERVICE REQUEST DATA | SERVICE TYPE ID NUMBER |

| JUDGEMENT CONDITION DATA 1, | DATA FOR JUDGEMENT 1,... | JUDGEMENT DATA N,... | JUDGEMENT CONDITION DATA M, | DATA FOR JUDGEMENT 1,... | DATA FOR JUDGEMENT... | CRC |

Fig.27
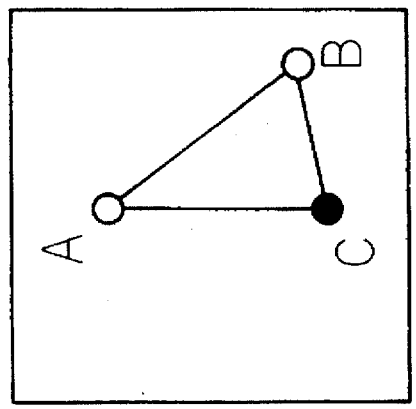
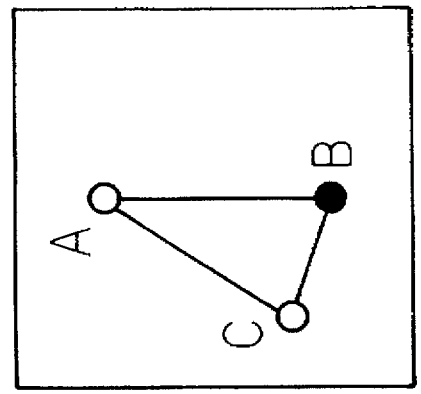
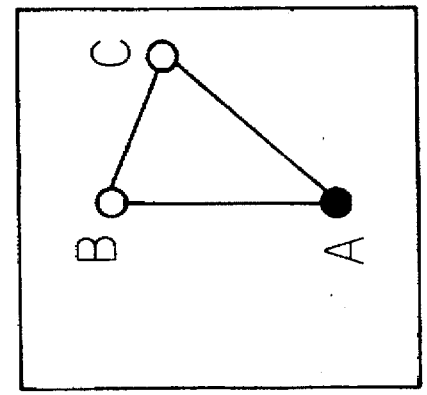

Fig. 33

| INTRA-GROUP COMMUNICATION DEVICE ID | INPUT DISPLAY AREA DATA |
|---|---|
| a | INPUT DISPLAY AREA:(640,480) |
| b | INPUT DISPLAY AREA:(640,480)<br>INPUT DISPLAY AREA LEFT TOP CORNER: (LEFT TOP CORNER (a),x+INPUT DISPLAY AREA (a),x,LEFT TOP CORNER (a),y) |
| c | INPUT DISPLAY AREA : (640,480)<br>INPUT DISPLAY AREA LEFT TOP CORNER (LEFT TOP CORNER (a),x,LEFT TOP CORNER (a),y)−INPUT DISPLAY AREA (c),y |

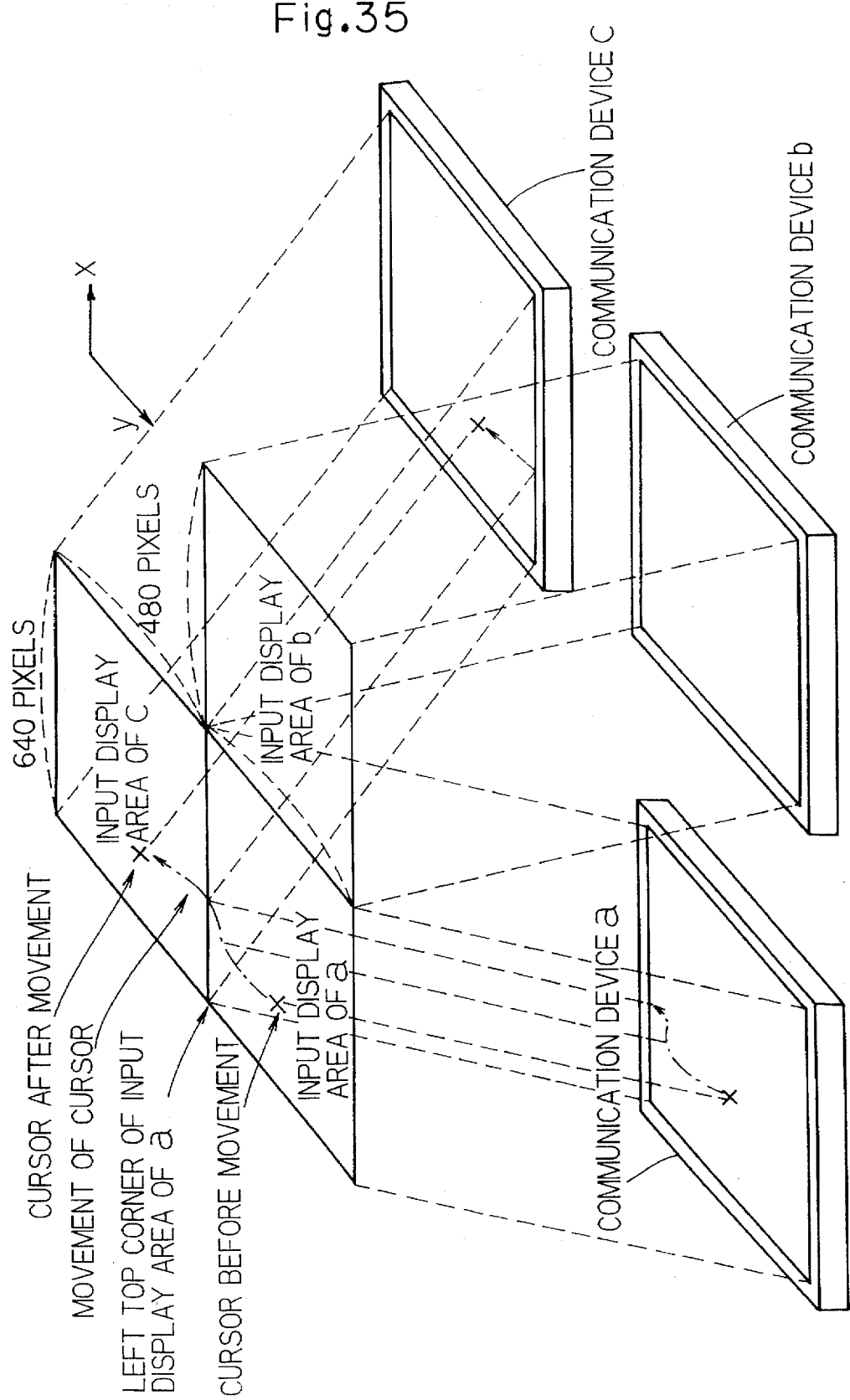

Fig.36

| INTRA-GROUP COMMUNICATION DEVICE ID | OUTPUT DISPLAY AREA CATA |
|---|---|
| a | INFORMATION: DOCUMENT-4<br>PAGE: p.25<br>OUTPUT DISPLAY AREA: (640,480) |
| b | INFORMATION: DOCUMENT (a)<br>PAGE: p.(a)+1<br>OUTPUT DISPLAY AREA: (640,480) |
| c | INFORMATION: FUNCTION MENU<br>OUTPUT DISPLAY AREA: (640,480) |

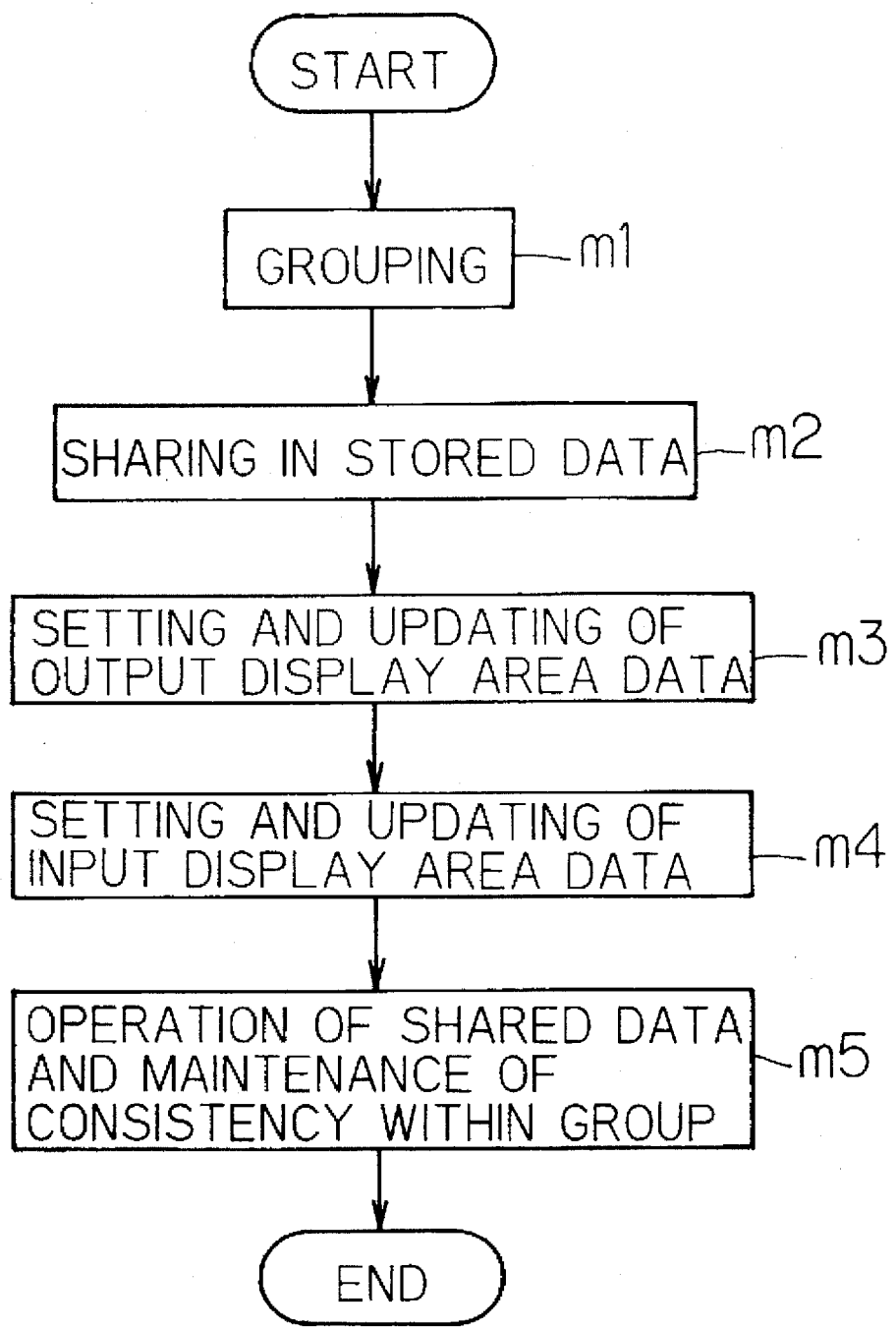

COMMUNICATION DEVICE

BACKGROUND OF THE INVENTION a. Technical Field

The present invention relates to a communication device which performs an exchange of information between its own communication unit and one or more other communication units.

b. Prior Technology (1) The conventional network connects devices installed in specific locations or desk-top units by means of wire communication means and both the component devices of the network and the users who use the connected devices are fixed. This network includes service providing devices which provide specific services in response to the users' requests.

The service providing device includes a shared data file service providing device, a kana-kanji conversion service providing device, a dictionary service providing device, a voice recognition service providing device, and a translation service-providing device, among others. In each service, a communication link between the client and the service providing device is first established on reception of a request for the service, the relevant processing is performed, the result of the processing and the information representing completion of the service are transmitted to the client through said communication link, and the communication link is canceled on completion of the service.

The service providing device which delivers the result of processing includes a shared data management service providing device, a kana-kanji conversion service providing device, a dictionary service providing device, a voice recognition service providing device, and a translation service providing device, among others. On the other hand, a voice synthesis service providing device and a printer service providing device, among others, are service providing devices which do not deliver the result of processing.

In the conventional network, since it is predetermined which device performs a given service and the data are registered in the respective devices connected to the network, the user requesting a service can obtain an automatic connection to the device which provides the requested service based on the data registered in his own terminal device. Moreover, where a plurality of devices capable of providing services are present on the network, concentration of the load on any specific one of them can be avoided by insuring that the load will be evenly distributed among them through variation of registered data for the respective users.

The registration of data can only be made by a specific manager and, therefore, in order to add or change the service providing device, the general user has to request the manager to that effect. However, the above scheme of resistering data in the respective devices calls for updating of the data in each device whenever a change of the service providing device has taken place and this imposes a burden on the user. In order that change of the network structure and change of service providing device can be made with good flexibility, a method is utilized which comprises resistering network structure data and service providing device data in a specific device connected to the network and the other devices are down-loaded with the data at initializing after power-on at the respective terminals. In this arrangement, as the information in the manager device is updated, each terminal device is enabled to request a service based on the change so made, with the result that savings can be realized in management time.

Recently with advances in hardware technology, the capability of portable devices has been increased to the level of the earlier desk-top terminal devices. In addition, radio communication means which takes the place of wire communication means have become available. Whereas the location of use of devices was confined in the past, such portable devices and radio communication means have enabled the user to move about carrying such a portable device and have access to the network from where he is currently located by utilizing the radio communication means.

Under the circumstances, the requirements of a network have also changed, so that a demand has emerged for greater flexibility of the network structure.

To meet the above demand, the present applicant previously proposed a new communication control apparatus and a new method for communication control utilizing radio communication means (Japanese Patent Application No. H-6-75757).

According to this proposed technology, a network can be constituted and communications be made with any desired party in any desired place by mere bringing together of the terminal devices. In this technology, a network can be established whenever necessary and be erased when unnecessary. Moreover, it is possible to add a device to the network or withdraw a device from the network, thus enabling a flexible operation of the devices.

(2) Recently, a technology has been proposed in which a plurality of communication devices on the network share the same data for collaborative work. This is a technology such that in cases where word processor document data are shared, for instance, change of the data by any one user results in the simultaneous change of the document data for the other users.

By connecting a plurality of communication devices through a logical communication link and making transmission of data in a multiple-address way to the communication devices connected to said logical communication link, a personal data can be distributed to a plurality of persons. Moreover, a change of data which occurred in a specific communication device is also reported in a multiple-address way to all the communication devices through said logical communication link and data updating is made in every communication device. In this arrangement, data can be shared by a plurality of communication devices. The term "logical communication link" is used herein to mean a connection of a plurality of mutually communicable communication devices demanding communications into a group without the user needing to take any special procedure.

In a collaborative work such as a conference or a collaborative writing of documents, there is not only the case in which the participants gather together at one time but also the case in which a new comer joins the collaborative work. In the latter case, the data currently shared has to be distributed to the new comer's communication device.

The sequence of distributing the shared data to a new communication device is now described with reference to the flow chart shown in FIG. 18. It is assumed that there are communication devices A, B, C and D which are connected through a logical communication link M, carrying the same data, and engaged for a collaborative work using said data, that the communication device B has been chosen as a coordinator or responding communication device, and that a communication device E not connected to said logical communication link M has made a connection request.

(Step k1)

As a new request for connection is received, the communication device that is to respond to the request is selected in the first place. When shared data are dispersively managed by the respective communication devices, a certain conciliation is made among the participants before starting a collaborative work or at starting an application and a specific communication device which is to assume this role is determined beforehand. When the collaborative work is a conference, for instance, the communication device which is to act, so to speak, as a chairman who presides over the conference is first selected.

The setting so established remains unaltered till the end of the conference except for cases in which the chairman withdraws himself partway in the course of the conference or a trouble occurs in the communication link.

The respective communication devices are then connected with the main logical communication link M and the data possessed by the respective individual devices are mutually distributed for sharing.

(Step k2)

Communication device E which is not connected to said main logical communication link M accesses the communication devices A, B, C and D on the logical communication link M through a control link which is communicable with all the communication devices to transmit a message requesting participation in the work.

(Step k3)

When each of the communication devices A, B, C and D has received the above-mentioned message, the communication device designated as the coordinator or responding communication device establishes a new sub-logical communication link N with communication device E through said control link.

(Step k4)

The communication device B then distributes the data already shared to the communication device E.

(Steps k5 and k6)

After distribution of the shared data, the sub-logical communication link N is erased and the communication device E is added to the main logical communication link M.

The distribution of shared data to a new communication device making a connection request is normally carried out in the above manner. However, in cases where the communication device B has defaulted for some reason or other or a trouble has occurred in the communication link to the communication device B when a new comer communication device makes a connection request, the request is not accepted.

Moreover, at the communication devices other than the cordinator device, the status of data distribution cannot be ascertained so that it was difficult for the participants in the collaborative work other than the cordinator B to confirm whether the data has been distributed to the new comer.

Furthermore, in the event that, when the communication device B is setting a sub-logical communication link N to communication device E and distributing the shared data, a message requesting data sharing is received from a new communication device F, either the new request must be caused to stand by until completion of the data distribution to communication device E or a separate process has to be started to establish a new logical communication link L to the communication device F. Thus, in the prior art, one communication device has to respond severally to requests from a plurality of communication devices.

(3) Recently with the spread of portable data communication devices which can be freely relocated, a need has arisen to couple them electronically for exchange of data. In this case, it is necessary to designate the other party's communication device. As a typical method, a number specific to the communication device is designated. However, in this case, there is the problem of discrepancy from the actual topological relationship.

(4) Furthermore, when editing is carried out for data on a certain subject matter or for information relevant to such data using a plurality of communication devices, it is a usual practice to store all or part of said data in the memories of the respective communication devices. The users edit and process the data stored in their respective devices independently and after completion of the editing, the results are consolidated.

The disadvantage of this method, despite sharing of the data stored in the respective communication devices, is that since each user performs editing and processing independently of the other users, no consistency can be obtained in the whole information stored among the respective communication devices.

In order to assure a consistency of data shared by a plurality of communication devices (hereinafter referred to as shared data), a system is known in which each communication device is provided with communication means and shared data managing means for assuring such consistency of data. Thus, when the shared data stored in a given communication device has been altered by user input with respect to the shared data in the memories of the communication devices, shared data change information is transmitted by said communication means to the other communication devices and using the shared data change information received from any other communication device, the shared data memorized in the communication device is updated by said shared data managing means.

Communication devices of the above type are in use as a collaborative documentation system or a teleconference support system.

However, with such communication devices, the display area data for the displays of the respective communication devices cannot be correlated among the devices for controlled output at each communication device.

Therefore, an output based on display area information such as "Display the page following page X of the document data on display at other communication device Y" cannot be generated at any given communication device.

With regard to input, too, it is impossible to correlate the user input display area data among a plurality of communication devices and accept the user input at the respective communication devices according to the correlation information.

In other words, it is impossible to perform an input processing for other communication devices through the input means of a given communication device.

The above problem is particularly pronounced when a plurality of communication devices are installed close to each other, a plurality of users sit face to face, and each user operates either one or more of the communication devices for exchange of data and shared data.

Specifically, if one user could point to this or that on the displays of other users' communication devices through the input means of his own communication device, all the users should easily understand what is meant.

However, in the above arrangement, it is necessary for one user to output the same data as the output of the other user at his own communication device and, then, enter an input so as to have "the message he entered" displayed on the display of the other user's device to point out "the change of shared data" and thereby cause the other user to understand the change.

However, the degree and speed of understanding by the other user are inferior to those available by direct pointing. Moreover, for the user who does pointing, too, he must focus his attention on manipulation on his own communication device, rather than on transmission of the message to the other user.

Therefore, it is impossible to take advantage of the otherwise efficient communication intrinsic to the situation that each of the users sitting face to face can ascertain what the other user or users are viewing, with the result that each of the users forces the other users to tolerate inefficient communications.

OBJECTS OF THE INVENTION (1) It has been explained under Prior Art (1) that in a system of managing service-related data on a network at respective communication devices, the device which renders the service must be functioning at all times. If a fault develops in that device, the other communication devices will not be supplied with constituent data any longer and be prevented from receiving the service.

In the network comprising devices each having the function to communicate with other devices in desired locations which was previously proposed by the present applicant, the devices which are to form the network cannot be designated beforehand so that service-related data to be provided on the network cannot be registered in pre-selected devices or specified devices. Therefore, it is necessary to register service-related data in the respective devices or a certain specified device every time a network is established.

However, modifying the data in the respective devices every time the network is altered imposes a burden on the users. In the case of registering service-related data in a specified device, the burden on the users can be alleviated but when this data managing device withdraws from the network, the service-related data are lost.

Therefore, the first and the second invention have for their object to provide a communication device such that the service to be provided by any device on a network need not be registered in the respective devices or a service providing device but rather, in response to a service call from a user, an automatic connection to his device is obtained for access to that service.

(2) In the conventional system explained under Prior Art (2), it is necessary for the participants in a collaborative work to consult with each other beforehand to assign the role of a coordinator or manager to a certain communication device and, moreover, the device to which said role has been assigned can hardly withdraw in the course of the collaborate work. Thus, if it could be withdrawn, it should then become necessary to choose a new communication device responsible for the distribution of data to any new comer from among the remaining communication devices.

Furthermore, if at the time of a call for connection the above communication device is faulty for some reason or other or a trouble develops in the communication link to the device to which said role has been assigned, the new comer cannot receive the shared data because a logical communication link to that communication device cannot be established.

Furthermore, in the event that, in the course of responding to a service call from one communication device, a request for connection is received from another communication device, the latter device which has belatedly made a request is not served until completion of data distribution to the first-calling device, so that a stand-by time is inevitable. As an alternative, a new logical communication link must be established between the coordinator device and the device that has made a new service call and a plurality of shared data distributions be concurrently made from one coordinator device.

Thus, in the above conventional system, the existence of a large quantity of shared data requires a prolonged time for distribution to a new comer so that a collaborative work with addition of the new comer cannot be promptly started.

The third invention has for its object to provide a communication device such that the distribution of shared data to new comers can be achieved without prior setting by persons who are to engage in a collaborative work and that shared data can be distributed with good efficiency even when requests are received from a plurality of communication devices at one time.

(3) As explained under Prior Art (3), the topological relationship of a plurality of communication devices cannot be determined and, therefore, it is difficult to designate the parties to data exchange at the time of said consultation.

In such a consultation, speech data are recorded but since the recording is made with a single communication device, it is contaminated with voices of many persons so that no high-quality record can be expected. Moreover, the playback is inevitably lacking in reality.

To overcome the above disadvantage, the fourth invention has for its object to provide a communication device such that persons participating in a conference or a consultation can be designated according to their topological relationship so that a remarkable increase in operability can be realized.

(4) As explained under Prior Art (4), when the data stored in the respective communication devices, data input from users, and data processed by a certain communication device are exchanged and processed among a plurality of communication devices, the display area data for each communication device controls only the display means of the corresponding communication device.

Therefore, the relation between the display area data displayed at one communication device and the display area data displayed at another communication device cannot be established.

In regard of user input data, too, it is impossible to enter data into any other device through the input means of one's own communication device.

Therefore, the fifth and the sixth invention have for their object to provide a communication device such that the user input data and display data can be shared and handled among and by a plurality of communication devices.

SUMMARY OF THE INVENTION (1) The communication device of the first invention comprises:
   a communication means which communicates with a plurality of other communication devices,
   a service request data detection means which detects a first service request data transmitted from any of said plurality of other communication devices through said communication means,
   a judging means which does, upon detection of said first service request data by said service request data detection means, judge whether that the conditions are met for providing the first service represented by said first service request data, a selection data communicating means which does, when said judging means has judged that the provision of said first service is possible, transmit data for selecting a communication device which is to provide said detected first service from among the communication devices at least satisfying the requirements for providing the first service represented by said detected first service request data excepting the communication device which has transmitted said detected first service request data, and a deciding means which does, according to the data for selecting said communication device, decides the communication device which provides said detected first service.

The communication device according to the first invention may be provided with a service request data transmitting means and a second service data receiving means.

The service request data transmitting means generates a second service request data representing a second service request and transmitting said second service request data to said plurality of other communication devices through said communication means.

The communication device according to the second invention comprises:

a communication means which communicates with a plurality of other communication devices.

a service request data transmitting means which generates a first service request data representing a first service request and transmits said first service request data to said plurality of other communication devices through said transmitting means, a service providability data detecting means which detects a first service providability data representing the feasibility of providing the service according to said first service request transmitted from said plurality of other communication devices through said communication means, and a selection means which selects a communication device for providing the service according to the first service request from among the communication devices meeting the conditions for provision of the first service as represented by the first service providability data detected by said service providability data detecting means.

Optionally this communication device according to the second invention may be provided with a service request data detecting means, a judging means, and a service providability data transmitting means.

The service request data detecting means mentioned above detects a second service request data transmitted from any of said plurality of other communication devices through said communicating means.

The judging means mentioned above judges whether the feasibility conditions are met for providing the second service represented by the second service request data detected by said service request data detecting means.

The service providability data transmitting means does, upon judgement by said judging means that the provision of said second service is feasible, transmit a second service providability data indicating that the provision of said second service is feasible.

(2) The communication device according to the third invention comprises:

a group setting means which connects the communication device of its own to a plurality of communication devices with which communications are desired and sets the communication devices into a group, a main logical communication link setting means which sets a main logical communication link by which all the communication devices belonging to the group set by said group setting means are brought into a mutually communicable state, a sub-logical communication link setting means which, on reception of a request of a new comer for participation in a collaborative work or sharing in the data from any new comer communication device not connected by said main logical communication link, sets a sub-logical communication link with said new comer communication device, a communication device selecting means which selects a communication device for setting said sub-logical communication link to said new comer communication device from among the communication devices constituting said group, and a data distributing means which distributes shared data as shared by said group to said new comer communication device through said sub-logical communication link set by said sub-logical communication link setting means.

(3) The communication device according to the fourth invention comprises:

a distance computing means which performs operations to generate distance data which represent the distances between the communication device of its own and other communication devices using acoustic signals generated by other communication devices and received from a microphone or acoustic signals for layout which are acoustic signals generated from the neighborhood and a topology determining means which determines the spatial relationship of all communication devices from the distances between the communication device of its own and other communication devices as computed by said distance computing means.

Thus, with the communication device of the fourth invention, the persons participating in a conference or meeting can be designated in a topographic perspective so that a remarkable increase in operability can be obtained. Moreover, the quality of speech data and the reality of the playback are enormously increased.

As mentioned above, with the communication device of the fourth invention, the persons participating in a conference or meeting can be designated in a topographic perspective so that a remarkable increase in operability can be obtained.

(4) The communication device of the fifth invention comprises:

an input means by which the user inputs documentary and diagrammatic data and the data designating positions in which they are to be displayed, an input display area data memory means which stores a user input display area data consisting of input display area field data representing the sizes of the input display areas of the respective communication devices and input display area correlation data representing the topographical relationship of said input display areas, a user input display area managing means which judges from the user input display area data stored in said user input display area data memory means whether the designated position entered by said input means is within the range of user input display area of its own, a display means which, upon judgement by said user input display area control means that the designated position is within the range of user input display area of its own, displays the input data in said designated position, and a communication means which, upon judgement by said user input display area control means that said designated position is outside said range of input display area, transmits information which enables a different communication device to display the input display area judged to be outside said range of input display area.

According to the communication device of the fifth invention, the display statuses of the input display areas of a plurality of mutually communicable data communication devices constituting a data processing system can be correlated with one another. As a consequence, data input can be freely made in the user input display areas of a plurality of data communication devices. In other words, a plurality of data communication device can be handled as if they were a single data communication device so that one or more users can do data processing in a flexible combination of a plurality of data communication devices.

The communication device according to the sixth invention comprises:

- a memory means which stores documentary and diagrammatic output data,
- an output display area data memory means which stores output display area data consisting of the output display areas, representing the size of output display area, of respective communication devices and the output display area correlation data indicating the topographic correlation of said output display areas,
- an output display area managing means which judges the output data display status of the output display area of its own from the output display area data stored in said output display area data memory means,
- a display means which displays the output information which was judged by said output display area managing means to be within the range of output display area of its own, and
- a communication means which, upon judgement by said output display area managing means that the output is outside the range of output display area of its own, transmits a message for enabling the display of the output area judged to be outside the range of output display area of its own at a different communication device.

According to the communication device of the sixth invention, the display statuses of the output display areas of a plurality of mutually communicable data communication devices in a data processing system can be correlated so that a plurality of data communication devices can be handled as if they were a single communication device and either one or more users can do data processing in a flexible combination of a plurality of data communication devices.

BRIEF DESCRIPTION OF THE DRAWINGS

FIG. 2 is a flow chart of the service-requesting device according to Embodiment 1a;

FIG. 3 is a flow chart of the device which receives a service request according to Embodiment 1a;

FIG. 4 is a typical structure of providable service identification data;

FIG. 7(a) shows a typical packet structure;

FIG. 7(b) shows a typical service request packet structure;

FIG. 7(c) shows a typical service-providing device selection data packet structure;

FIG. 7(d) shows a typical service request acceptance packet structure;

FIG. 7(e) shows a typical service providability data packet structure;

FIG. 8 shows a typical group communication packet structure;

FIG. 9 shows a typical service providability condition data structure;

FIG. 10(a) shows a typical user information structure and FIG. 10(b) shows a typical packet structure;

FIG. 11 shows a typical conditioned service request packet structure;

FIG. 27 is a diagram showing examples of layout;

FIG. 33 shows examples of the user input display area data memory;

FIG. 35 is a flow chart of the input display area management;

FIG. 36 shows a typical output display area data memory;

FIG. 40 is a flow chart of overall processing; and

DETAILED DESCRIPTION OF THE PREFERRED EMBODIMENTS

The first and second inventions
Embodiment 1a

Figure 1:
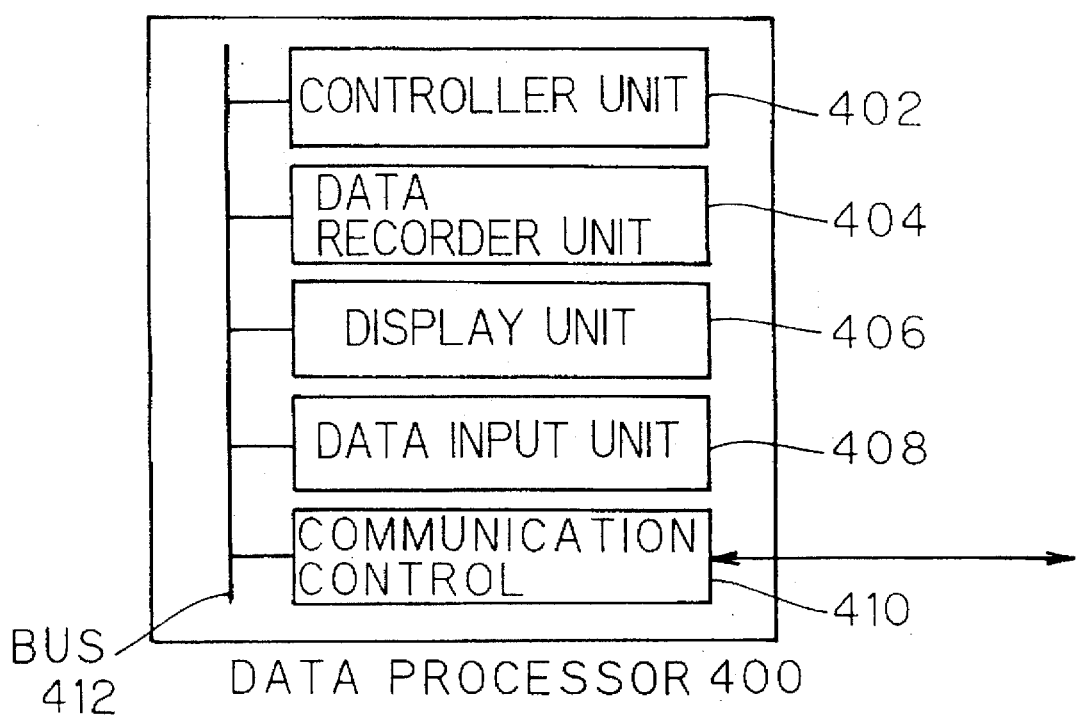
FIG. 1 is a block diagram of the data processing device according to the first and second inventions.
Figure 2:
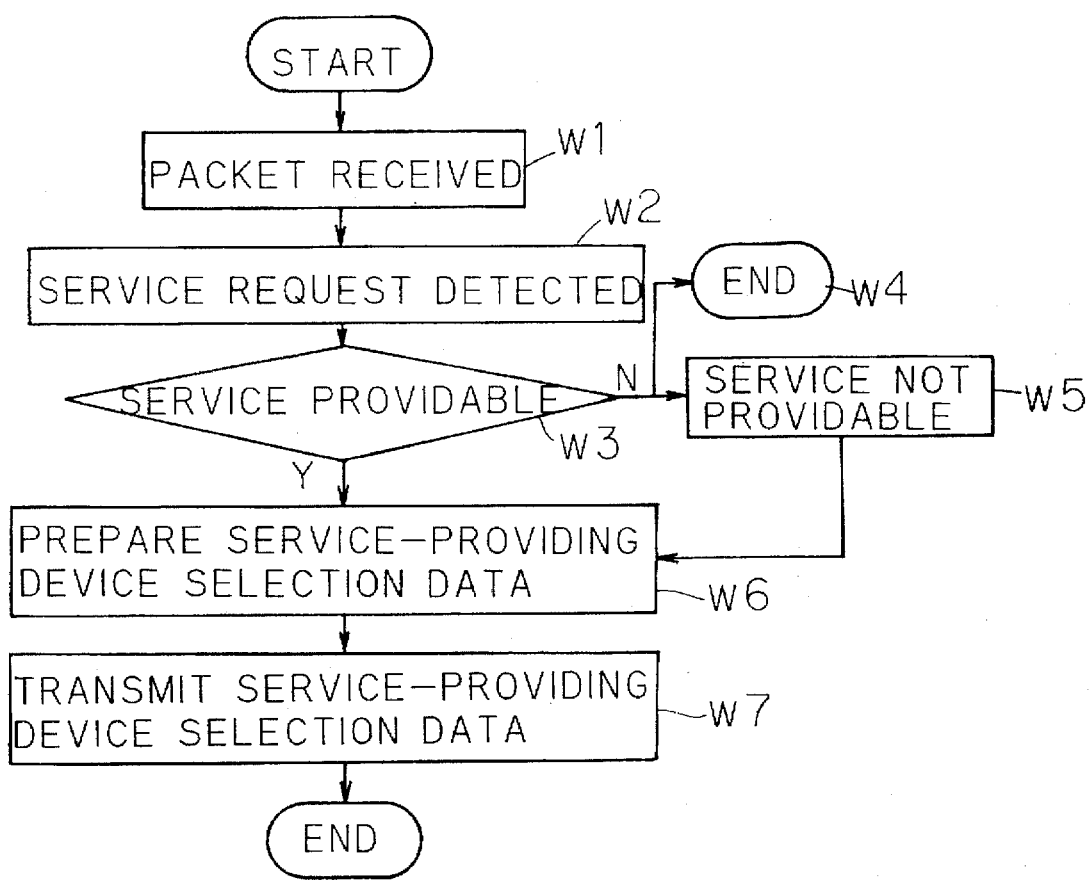
Figure 3:
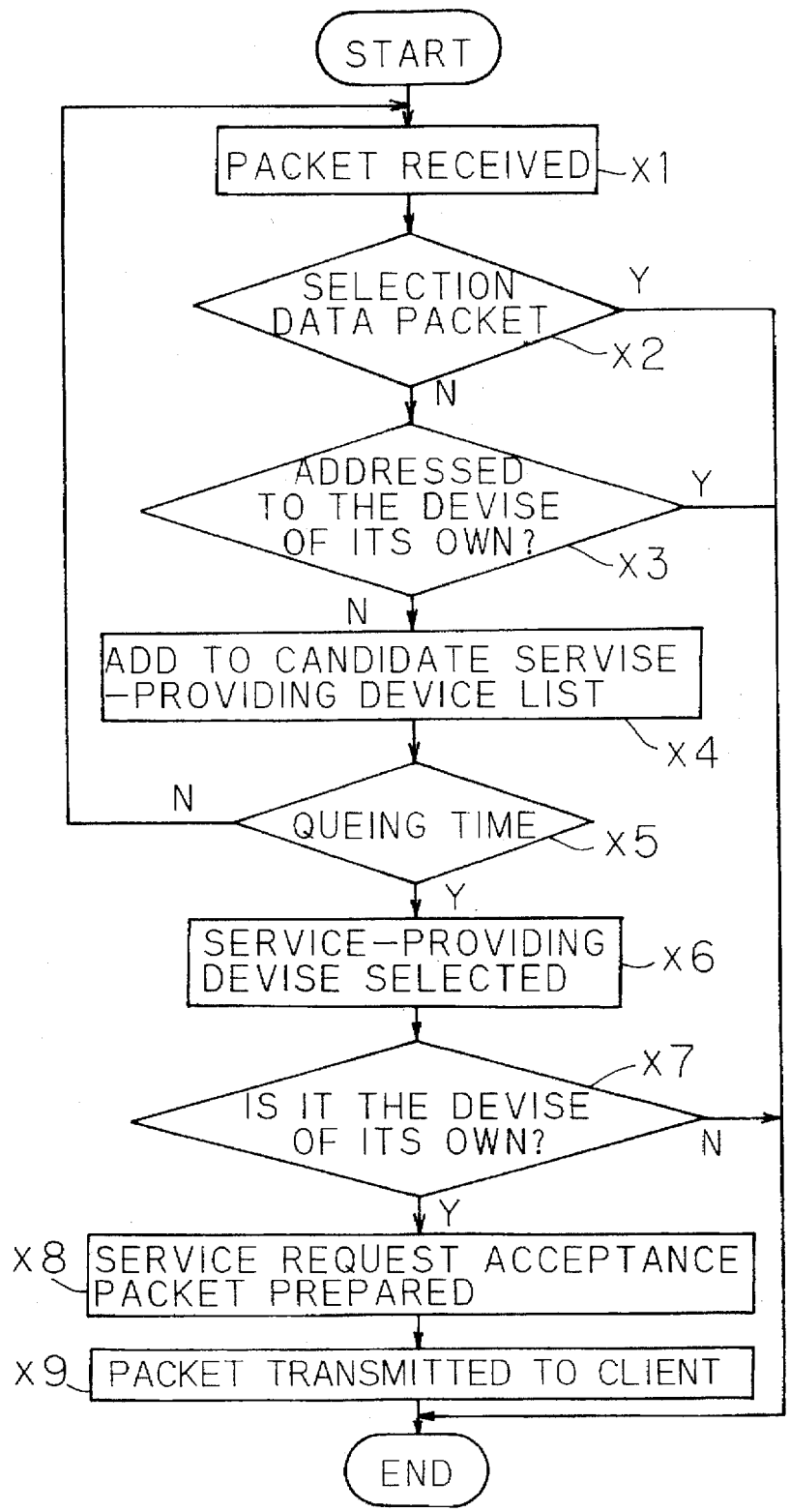

FIG. 1 is a block diagram showing the architecture of a data processing device as an embodiment of the present invention, which requests or provides services. FIG. 2 is a flow chart of processing which begins upon reception of a service request and FIG. 3 is a flow chart of processing for determining a service providing device.

A controller unit 402, comprised of a CPU, executes a service request program.

A data recorder unit 404, comprised of a memory or a hard disk, records data about service request programs and providable services and information on the users or clients.

A display unit 406 displays data for the user.

A data input unit 408 controls the user's key input and mouse input.

A communication control unit 410 which exchange data with external stations can be implemented by any of wire, radio, light, infrared light or sound communication systems. There is also a reception buffer which stores received data.

The controller unit 402, data recorder unit 404, display unit 406, data input unit 408 and communication control unit 410 are connected with a bus 412 for the traffic of data and control messages. The architecture of the data processing device for providing services is also similar to the above architecture.

The following status is established as one in which this embodiment can be effectively utilized.

There exist data processing units A, B, C, D and E which are connected to a common network. It is assumed that the user having said data processing device A makes a service call or request. It is also assumed that, among B, C, D and E, B and D are capable of providing the requested service.

(Processing by data processing device A)

The data input unit 408 of data processing device A receives a service request from the user.

FIG. 7(a) shows a typical packet structure and FIG. 7(b) shows a typical service request packet structure.

The packet is comprised of a packet length section, an addressed device identification data section, a transmitting device identification data section, a data section, and a CRC.

The packet length in the packet length section represents the length of the packet.

The addressed device identification data in the addressed device identification data section represents the information necessary for designating a device which is to receive the packet.

The transmitting device identification data in the transmitting device identification data section represents the identification data of the device which has transmitted the packet.

The data in the data section are the data to be exchanged between devices.

The CRC is designed to detect any error.

Specifically, with regard to the service request packet, the predetermined data representing the numbers assigned to all the devices are set in the destination device identification data section for enabling transmissions to all the devices on the network. In the transmitting device identification data section, the identification number of device A is set.

In the data section, a predetermined service request data and the service identification data shown in FIG. 4 (the service identification numbers signifying the kinds of service or titles of service) are set.

(Processing in data processing devices B, C, D and E)

The communication control unit 410 of any of data processing devices B, C, D and E receives data and stores it in a reception buffer (cf. Step w1 in FIG. 2).

The communication control unit 410 analyzes the destination device identification data of the received data. In this example, all the devices are destinations and, therefore, the data indicated by the packet length is read from the reception buffer.

The communication control unit 410 compares the data in the data section of the packet with said predetermined service request data.

Where an agreement is found, the service request is notified to the controller unit 402 (cf. step 32 w2 in FIG. 2). The controller unit 402 examines the address.

When all the devices are destinations, the controller unit 402 judges whether the device of its own can provide the service (cf. Step w3 in FIG. 2).

The data on the service which can be used for judging this providability is stored as the service identification number or title in the data recorder unit 404.

When it is judged that the requested service can be provided by the device of its own, a service-providing device selection data packet necessary for selection of a service-providing communication device is prepared (cf. Step w6 in FIG. 2).

In the present example, the devices B and D execute the step of preparation of the packet.

A typical construction of said service-providing device selection data packet is illustrated in FIG. 7(c).

The identification numbers representing all the devices are registered in the destination device identification data section.

The identification number of the device of its own is set in the transmitting device identification data section.

In the data section, the service-providing device selection data and the data for selection are registered.

As said data for selection, the identification number of each device, user identification number, CPU capacity data, and CPU load data can be utilized. It is determined previously which of such data is to be utilized.

The service-providing device selection data packet thus prepared is transmitted via the communicating section (cf. Step w7 in FIG. 2).

As to the devices C and E which cannot provide the service, the procedure ends (cf. Step w4 in FIG. 2). As an alternative, the data signifying the inability to provide the service may be transmitted as data for selection (cf. Step w5 in FIG. 2). It is now assumed that the device C has transmitted the data.

Selection of a service providing device is now described with reference to FIG. 3.

The devices B, C, D and E receive the selection data packet from each device (cf. Step x1 in FIG. 3).

When the provision of the service from the device of its own is feasible, the identification number of its own device as a candidate service providing device as well as selection data are registered beforehand.

The communication control unit 410 examining the destinations and finding that all the devices are destinations reads out the data from the reception buffer and analyzes it. Having judged that it is a selection data packet (cf. Step x2 in FIG. 3), the control notifies to the controller unit 402 to that effect. The controller unit 402 compares the identification number of the service-requesting device with the identification number of the device of its own (cf. Step x3 in FIG. 3). In the case of agreement, the procedure ends. In the case of non-agreement, the identification number of the device which transmitted the selection data and the selection data are added as a candidate service providing device (cf. Step x4 in FIG. 3).

The reception of the selection data packet is available for a predetermined time following reception of a client's service request (cf. Step x5 in FIG. 3).

After lapse of the predetermined standby time, selection of a service providing device is performed according to the device selection data corresponding to the device registered as a candidate (cf. Step x6 in FIG. 3). As each device performs selection of a service providing device in the same way, the same device can be selected at each device (It is assumed that B is selected).

As to the method of selection, the device which has transmitted the smallest data of the received data for selection is selected (In this case, a large figure can be selected as representing data which cannot be provided). As an alternative, the device which has transmitted the largest data may likewise be selected.

After selection of the service providing device, it is judged whether the selected device identification number is the number of the device of its own (cf. Step x7 in FIG. 3).

When the device of its own is selected as the service providing device, the service request acceptance packet shown in FIG. 7(d) is prepared (cf. Step x8 in FIG. 3).

The identification number of the service-requesting device A is registered in the destination device identification data section.

In the transmitting-device identification data section, the identification number of the device of its own, viz. B, is registered.

In the data section, the identification number signifying an acceptance of the service request is registered.

After preparation of the packet, the packet is transmitted through the communication control unit 410 (cf. Step x9 in FIG. 3).

In this stage, the device A also receives the service-providing device selection data packet from each of B, C and E. Because all the devices are destinations, the communication control unit 410 reads out the packet from the reception buffer and analyzes it. Having judged that it is a selection data packet, the controller unit 402 is notified to that effect. The controller unit 402 compares the identification number of the service-requesting device with the identification number of the device of its own. In the case of agreement, the procedure ends and the received data are disposed of.

Thus, as a service request is made to the respective devices on the network and the service providing device is selected, a communication with the service providing device can be automatically established without registering the data on the service providing device in each device or any specified device beforehand. Furthermore, when the device C has withdrawn from the network or a communication trouble has developed when a request for service is made, no service-providing device selection data packet comes from the device C. Therefore, since the service providing device selection is made excluding the device C, the service providing device can be selected from among the communicable devices upon service request.

Embodiment 1b

Figure 5:
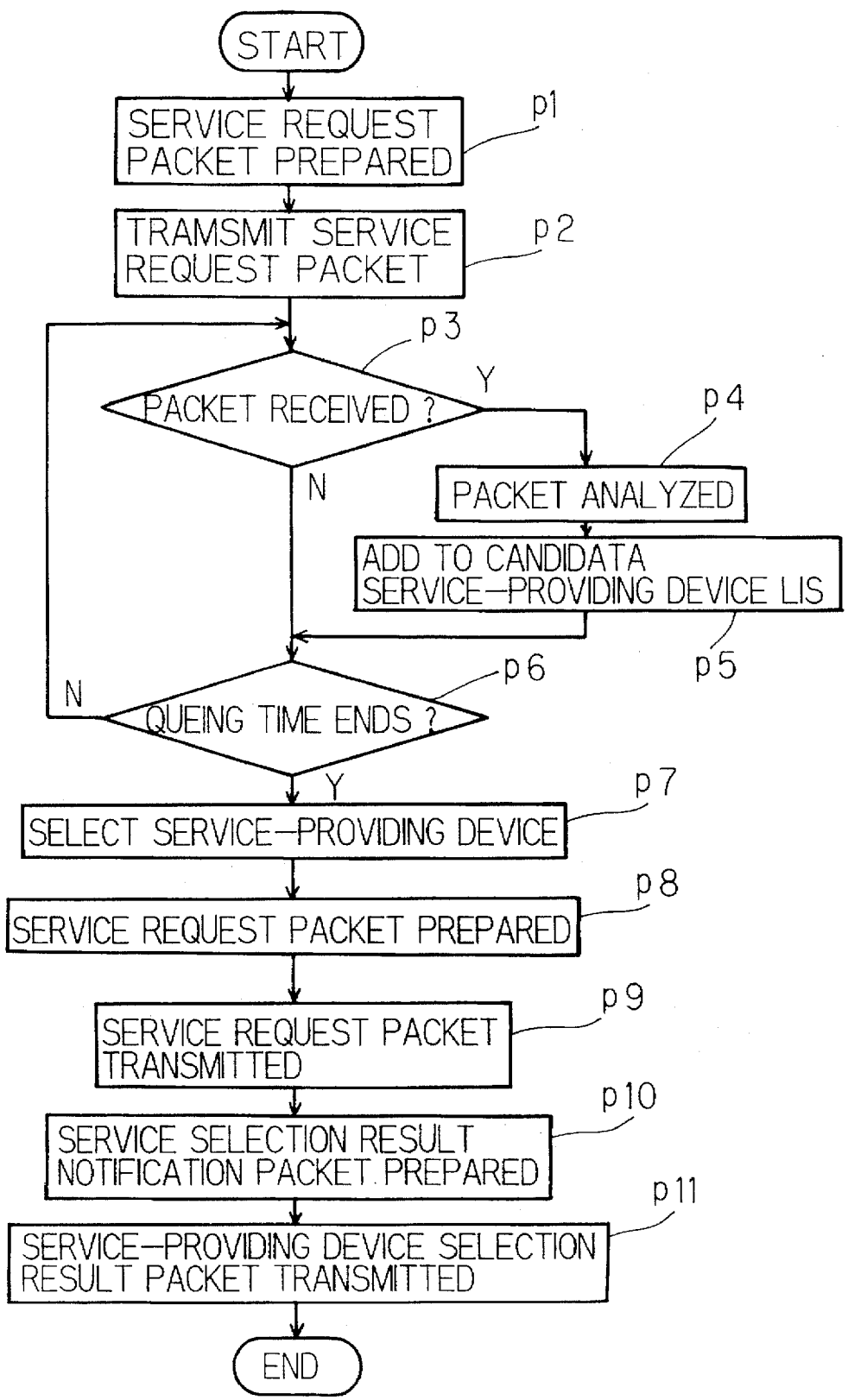
FIG. 5 is a flow chart of the device which receives a service request according to Embodiment 1b.
Figure 6:
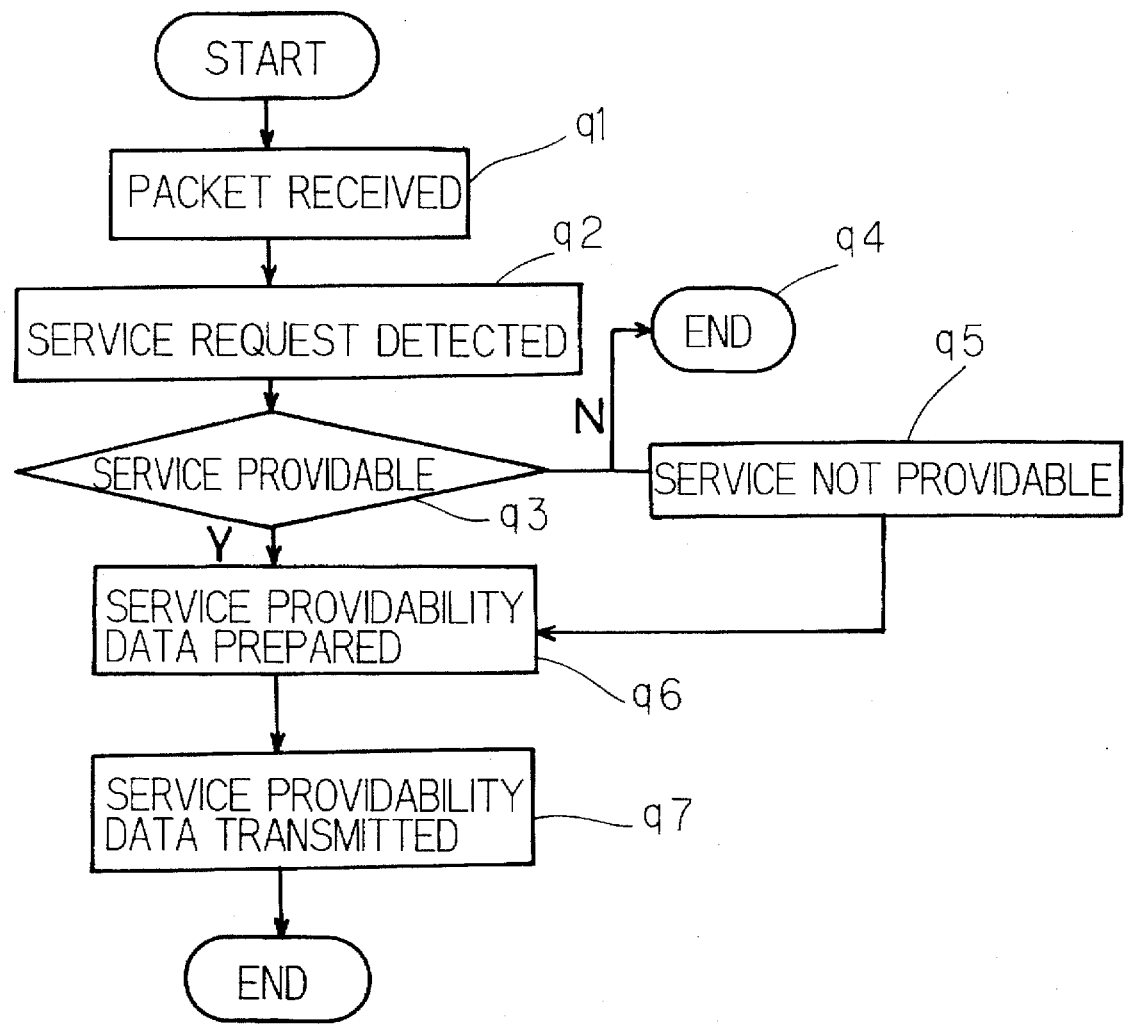
FIG. 6 is a flow chart of the service request-receiving device according to Embodiment 1b.

FIG. 1 is a block diagram showing the architecture of a data processing device according to this embodiment, which requests or provides a service. FIG. 5 is a flow chart of processing for a service request and FIG. 6 is a flow chart of processing for receiving a service request packet.

The controller unit 402, comprised of a CPU, executes a service request program.

The data recorder unit 404, comprised of a memory or a hard disk, records information on service request programs and services that can be provided and data relevant to the user.

The display unit 406 displays data for the user.

A data input unit 408 controls the user's key input and mouse input.

The communication control unit 410 transacts with external in data and can be implemented by any of the wire, radio, light, infrared light and sound communication methods. There is also a reception buffer which stores received data.

The controller unit 402, data recorder unit 404, display unit 406, data input unit 408 and communication control unit 410 are connected with a bus 412 for transactions in data and control direction. The architecture of the data processing device for providing a service can also be similar to the architecture described above.

The following status is established for effective utilization of this embodiment.

There exist data processing devices A, B, C, D and E, all of which are connected to the same network. It is assumed that the user having the data processing device A is making a service request and that, among B, C, D and E, B and D are capable of dealing with the requested service.

(Processing in data processing device A)

The data input unit 408 of the data processing device A accepts a service request instruction from a user. The controller unit 402 prepares a service request packet for making a service request (cf. Step p1 in FIG. 5) and transmits the packet from the communication control unit 410 (cf. Step p2 in FIG. 5).

FIG. 7(a) shows a typical packet architecture and FIG. 7(b) shows a typical service request packet architecture.

The packet is comprised of a packet length section, an addressed device identification data section, a transmitting device identification data section, a data section, and a CRC.

The packet length in the packet length section represents the length of the packet.

The addressed device identification data in the addressed device identification data section represents the information for designating a device which is to receive the packet.

The transmitting device identification data in the transmitting device identification data section represents the identification data of the device which was transmitted the packet.

The data in the data section are the data to be transacted between devices.

The CRC is designed to detect any error.

Specifically, with regard to the service request packet, the predetermined numbers representing all the devices are set in the destination device identification data section for enabling transmissions to all the devices on the network. In the transmitting device identification data section, the identification number of device A is registered.

In the data section, a predetermined service request data and the service identification data shown in FIG. 4 (the service identification numbers signifying the kinds of service or titles of service) are registered.
(Processing with data processing devices B, C, D and E)

The communication control unit 410 of any of data processing devices B, C, D and E receives data and stores it in a reception buffer (cf. Step q1 in FIG. 6).

The communication control unit 410 analyzes the destination device identification data of the received data. In this example, all the devices are destinations and, therefore, the data indicated by the packet length is read from the reception buffer.

The communication control unit 410 compares the data in the data section of the packet with said predetermined service request data.

Where an agreement is found, the service request is notified to the controller unit 402 (cf. Step q2 in FIG. 6). The controller unit 402 examines the address.

When all the devices are destinations, the controller unit 402 judges whether that the device of its own can deal with the service.

The controller unit 402 examines the type of service requested and decides on whether the device of its own can provide the service. The data on the service which can be used for judging this providability is stored as the service identification number or title in the data recorder unit 404.

When it is judged that the requested service can be provided by the device of its own, a service providability data packet necessary for selection of a service-providing communication device is prepared (cf. Step q6 in FIG. 6).

In the present example, the devices B and D execute the step of preparation of the packet.

A typical construction of said service providability data packet is illustrated in FIG. 7(e).

The identification number of the service-requesting device A is set in the destination device identification data section.

The identification number of the device of its own is set in the transmitting device identification data section.

In the data section, the service providability data and the data for selection are set.

As said data for selection, the identification number of each device, user identification number, CPU capacity data, and CPU load data can be utilized. It is determined previously which of such data is to be utilized.

The service providability data packet thus prepared is transmitted via the communication control unit 410 (cf. Step q7 in FIG. 6).

As to the devices C and E which cannot provide the service, the procedure ends. As an alternative, the data signifying the inability to provide the service may be transmitted as data for selection (cf. step q5 in FIG. 6). It is now assumed that the device C has transmitted the data.
(Processing in communication device A)

Device A analyzes the packet addressed and transmitted to itself (Step p3, 4, and 5 in FIG. 5). The device identification data of the device which has transmitted the service providing-device availability data and the device selection data are managed in collation. It waits for arrival of a service-providability data packet for a predetermined time (Step p6 in FIG. 5).

After expiration of said predetermined time, the device which had requested selection of the service-providing device performs selection of a service providing device according to the device selection data (Step p7 in FIG. 5). The method of selection may comprise selecting the device which has transmitted the minimum data or the maximum data of the received selection data as the service providing device.

After selection of the service providing device, a service request is made to the selected device (Steps p8, 9 in FIG. 5). In this case, the identification number of the device selected as the service providing device is set as the address of the packet. It is now assumed that device B has been selected.
(Processing in communication device B)

The controller unit 402 of device B analyzes the received packet to detect the service request addressed to itself.

The controller unit 402 of device B executes the service-providing program.
(Processing in communication device A)

As the controller unit 402 of service-requesting device A which has selected the service providing device, prepares a packet showing the result of service providing device selection (Step p10 in FIG. 5) and transmits the packet from the communication control unit 410 (Step p11 in FIG. 5), the respective devices on the network are informed of the result of service-providing device selection.

The condition or characteristic of provision of service of each device may be included in the selection data of the service providability data packet so that device A may select the service providing device with reference to the condition or characteristic term. In the case of translation service, the term may for example be fast translation or accurate translation.

Embodiment 1c

The device described in Embodiment 1a may receive a second service request from the user of the device of its own in the course of responding to a first service request from another communication device and thereupon requests a service by some other device. In such a case, by following the procedure described for the processors (B, C, D, E) receiving a service request in Embodiment 1a and the procedure described for the processor (A) in Embodiment 1a, it is possible to successfully respond to the service request from said another device and making a service request from the user of the device of its own to said other device.

Embodiment 1d

There may be a case in which the device described in Embodiment 1b receives a second service request from another device in the course of making a first service request to some other communication device and responds to the service request from said another device. In such a case, by following the procedure described for the devices (B, C, D, E) receiving a service request in Embodiment 1b and the procedure described for device (A) making a service request in Embodiment 1b , it is possible to make a service request from the user of the device of its own to said other device and respond to the service request from said another device.

Embodiment 2

The second embodiment is now described. The execution steps distinguishing this embodiment from Embodiment 1a are now described.

The following status is established for effective utilization of this embodiment.

There exist data processing devices A, B, C, D and E, all of which are respectively connected to the same network. It is now assumed that devices A, B and C constitute a group X, while devices D and E constitute a different group Z. It is also assumed that the user of data processing device A prepares group X and makes a service request. First, the communication device detection method, group managining method, and group communication method are respectively described below.

(1) The communication device detection method

The controller unit 402 periodically transmits a device confirmation packet to all devices via the communication control unit 410 and judges that the devices responding to the device confirmation packet are communicable devices.

The device identification numbers of said communicable devices are preserved in the data recorder unit 404. At device A, it is judged that B, C, D, and E are communicable devices.

(2) The group managing method

The controller unit 402 manages a plurality of devices as a single logical group in accordance with the user's designation. When a group forming instruction is received from a user, communicable devices are displayed at the display unit 406. The term "logical group" is used herein to mean a cluster of data processing devices, inclusive of the device of its own, which are communically interconnected through the logical communication link described in connection with the fourth invention.

The user can designate only the communicable devices as constituting a group.

The controller unit 402 of the device possessed by the user who requested grouping provides a group identification number to the group so formed and manages the group identification number as correlated with the identification numbers of the devices belonging to the group. For example, the controller unit 402 of device A assign devices A, B and C to group X and maintain the data in that correlation in its data recorder unit 404. In this case, a notice of grouping together with the identification numbers of devices forming the group is transmitted to all the communicable devices.

The controller unit 402 of each device stores the group identification number and the identification numbers of devices constituting the group as a unit in the data recorder unit 404. Thus, the controller units 402 of devices B, C, D and E can also correlate devices A, B and C with group X and manage the data in the respective data recorder units 404.

When a device is added to the group or any device belonging to the group withdraws from the group, the group managing data is updated at each device.

(3) The group communication method for communication with devices of a designated group only is now described.

A group identification data section is provided in the destination identification data section of the packet and the group identification number is set.

A typical construction of a packet for group communication is shown in FIG. 8(c).

The communication control unit 410 of each device does, on reception of data, examine the group identification data, compare the data with the group management data, and, if it is addressed to the group to which the device of its own belongs, read out and analyze the received data from the buffer.

(Processing in Device A)

The controller unit 402 of device A prepares a service request packet supplemented with the identification number of the group to which the device of its own belongs and transmits it via the communication control unit 410.

(Processing in Device B and C)

The communication control unit 410 of any device (B and C in this example) belonging to the corresponding group analyzes the group identification number and destination device identification number.

Since the group identification number is that of the group to which the device of its own belongs and all devices are destinations in this example, the data are retrieved from the reception buffer and analyzed the data section. As the service request data is detected, a service request detection signal is transmitted to the controller unit 402. The controller unit 402 judges whether the service can be provided or not and when the service can be provided, a service-providing device selection data packet equipped with group identification data is prepared and transmitted via the communication control unit 410. Therefore, selection of the service providing device can be expedited by selecting it from among the devices belonging to the group.

Thus, a quick service can be realized by managing a plurality of devices on a network as a group and selecting the service providing device from the group in response to a service request. Moreover, by transmitting a service request packet to the devices constituting the group, service requests are accepted only from devices of the group to which the device of its own belongs so that the provision of services in response to service requests from specified persons is made feasible.

Embodiment 3

The third embodiment is now described with reference to the execution steps differentiating it from the foregoing embodiments 1a, 1b and 2.

The controller unit 402 of the device requesting a service does, after selection of the service providing device, store the identification number of the device selected as the service providing device in correlation with the service request data in the data recorder unit 404.

When a service request is received from a user, the controller unit 402 compares the data with the service request data stored in the data recorder unit 404.

When an agreement is found, a service request packet for the corresponding device is prepared and transmitted via the communication control unit 410.

When no agreement is found, the service request steps described in connection with Embodiment 1a or 1b are executed.

By storing the identification number of the service providing device thus selected and memorizing the data in correlation with the service request data in the data recorder unit 404, it is no longer necessary to select a service providing device each time a service request is received from a user so that a quick provision of services can be assured.

Embodiment 4

The forth embodiment is now described with regard to the execution steps differentiating it from Embodiments 1 and 2. Here, the case in which the service providing device has rendered a judgement of procedure end and the case in which the service-requesting device has rendered a similar judgement.

(1) The case in which the service providing device has rendered a judgement of procedure end.

When the controller unit 402 of the service providing device has rendered a judgement of procedure end, the program for providing the service is interrupted.

The judgement of procedure end is rendered when a predetermined service end call packet is received from the service-requesting device or when it is detected that the service-requesting device has withdrawn from the network.

A typical method of detecting withdrawal of the service-requesting device is that the service-requesting device is regarded as having withdrawn when a packet representing completion of data reception has not been received by the service providing device within a given period of time after transmission of data to the service-requesting device.

Thus, even when the service-requesting device withdraws from the network in the course of providing the service, the provision of the service can be duly carried into completion.

(2) The case in which the controller unit 402 of the service-requesting device has rendered a judgement of procedure end is now explained.

The judgement of procedure end is rendered when a predetermined data is received from the service-providing device. It is, thus, found that the service-requesting device has obtained the service properly.

When it is detected that the service providing device has withdrawn from the network before reception of this service completion data, the user who requested the service can ascertain that the service rendered is incomplete. In such a case, the controller unit 402 of the service-requesting device makes a service request again to correct for the defect.

When the service has been duly carried to completion, the controller unit 402 of the service-requesting device prepares a packet representing the end of service and as the packet is transmitted from the communication control unit 410 to the other devices, these devices can be informed of completion of the service.

Embodiment 5

Embodiment 5 is now described with regard to the execution steps differentiating the embodiment from Embodiment 4.

The controller unit 402 of any other device than the service-requesting device and service providing device does, after transmission of a service-providing device selection data packet, stores the service request data such as the service requested and the service-requesting device identification number, among others, in the data recorder unit 404.

When an interruption of service is detected, the step of selecting the service providing device is executed again based on the service request data stored in the data recorder unit 404.

The status of interrupted service can be detected by the following steps.

The controller unit 402 periodically performs the transmission and reception of data to and from other devices to verify the existence of said other devices on the network.

If the transmission and reception of data cannot be made with any device, the particular device is regarded as having withdrawn.

The identification number of the device that is regarded as having withdrawn is compared with the identification number of the selected service providing device as stored in the data recorder unit 404. If an agreement is found, it is judged that the service is in the interrupted status.

The identification number of the service providing device as stored in the data recorder unit 404 is updated on notification of service end.

Thus, when the service providing device has withdrawn from the network before completion of service, all the devices other than the service-requesting device select a service providing device again based on the service request data retained and the service is provided. In this manner, the provision of service is continued even if the service providing device withdraws from the network.

Embodiment 6

Embodiment 6 is now described. The providable service data stored in the data recorder as described in Embodiments 1a, 1b, 1c and 1d is recorded in combination with at least one providability condition in the form of character information. A typical construction of the service providability condition data is illustrated in FIG. 9. The service-requesting device transmits a service request packet containing the user information shown in FIG. 10(*a*). The control of each device receiving the service request judges whether the requested service can be provided by the device of its own. If it is providable, the user information is compared with the providability conditions. When at least one of the providable conditions is contained in the user information, it is judged that the service can be provided and the service-providing device selection data or the service providability data is transmitted.

By transmitting the service-providing device selection data or the service providability data when the users satisfy the condition, the service can be provided only to the user having relevant authority. Thus, by managing the service providability condition in association with the providable service data and comparing the information with the user information on the service-requesting person when a service request is received, it is possible to selectively provide the service to the person or persons having relevant authority.

Embodiment 7

FIG. 11 shows a typical construction for a conditioned service request packet. The control of the service-requesting device prepares a conditioned service request packet containing at least one set of data indicating a conditioned service request data, data indicating the kind of service and a judging condition presenting data designating the method of judging for a service providing device, and data for at least one judgement as typically illustrated in FIG. 11. The judging condition for a service providing device, the capability of the CPU, the size of the mounted memory, and the current CPU load may be mentioned. Such a judging method is predetermined as a number and recorded in the data recorder of the device. In the case of a encyclopedia, a request may be made with the publisher as the judging method and Company A or B as the data for judgement. Or when a translation is performed, a request may be made using a dictionary of technical terms as the judging method and electrical as the data for judgement. As to a method for plural judgements, a request may be made with the publisher as the judging method, Company A as the data for judgement, a dictionary of technical terms as the judging method, and electrical as a data for judgement.

The conditioned service providing procedure is now described. The control of each device receiving a conditioned service request judges whether the requested service can be provided by the device of its own. If it is providable, it is judged by all the judgement methods whether the device of its own can deal with the data for judgement.

Taking the load on the CPU as an example, the load value of the device of its own is measured to see whether it is not over the designated data. Or, in the case where the kind of service is an encyclopedia, the judging method is the publisher, the data for judgement is Company A, and the publisher of the encyclopedia available is Company A, it is judged that the service can be provided. When a judgement of providability is assured by all the designated parameters, the service-proving device selection or service providability information is transmitted.

As only the device satisfying such conditions transmit service-providing device selection data or service providability information, only the device satisfying conditions is selected as the service providing device. Thus, when such a conditioned service request is made and the service providing device meeting the condition is selected, the service can be obtained from a high-capacity device or a device with a light load so that efficient services can be expected. Moreover, because the method for provision of a service can be designated, for example a dictionary of technical terms can be designated in a translation work, the quality of service can be enhanced.

Embodiment 8

Embodiment 8 is now described with regard to the execution steps differentiating the embodiment from Embodiment 1a and Embodiment 1b.

When the controller unit 402 has judged that the service providing device cannot be selected, a predetermined message stored in the data recorder unit 404 is displayed at the display unit 406.

The judgement of inability to select a service-providing device can be made by the following steps.

Referring to Embodiment 1a, when the controller unit 402 making a service request does not receive a service request acceptance packet within said predetermined time after transmission of a service request packet, a judgement of inability to select a service providing device is rendered.

In Embodiment 1b, a judgement of inability to select a service providing device is rendered when the controller unit 402 of the service-requesting device has not received any service provision feasibility data packet within a predetermined time or no device that can provide the service could be selected.

Thus, by displaying a message to the user in the event of inability to provide a service, the user is allowed to understand the status.

The third Invention

Embodiment 1

Embodiments of this third invention are now described with reference to FIGS. 12–18.

Figure 12:
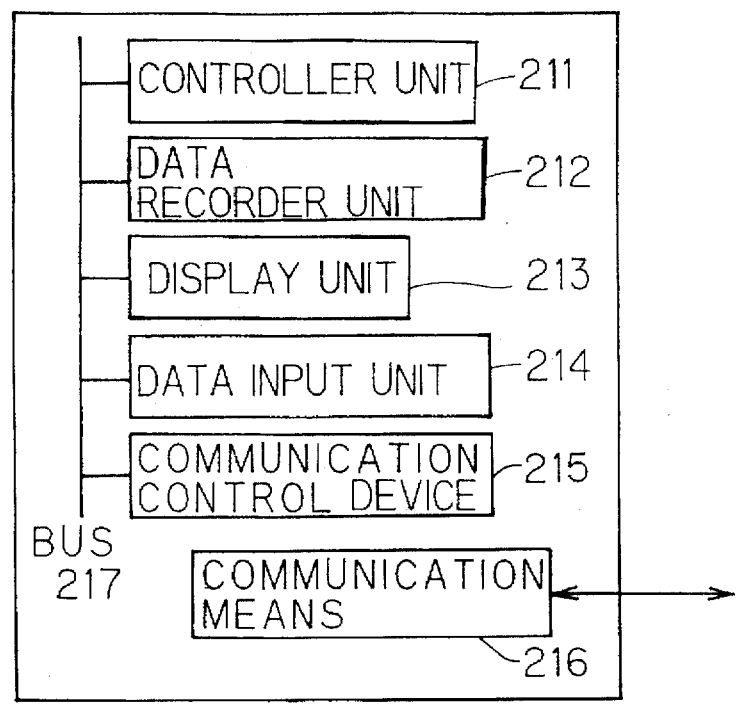
FIG. 12 is a block diagram of a communication device according to one embodiment of the third invention.

FIG. 12 is a block diagram showing the architecture of a communication device for data sharing in accordance with this embodiment.

In the block diagram, a controller unit 211, comprised of a CPU, controls the execution of a program like data sharing in a conference in accordance with a predetermined sequence of steps.

A data recorder unit 212, comprised of a memory or a hard disk, records a data sharing execution program, data to be shared, and data for communication management.

A display unit 213 displays shared data and messages from the program.

A data input unit 214 manages user's key input and mouse input.

A communication control unit 215 manages the identifiers necessary for identification of communication devices, specifices the destination communication devices using the identifiers, and establishes a logical communication link. This communication control unit 215 is similar to the communication control device 100 which is described hereinafter with reference to the fourth invention. Moreover, the same definition as described hereinbefore applies to the logical communication link mentioned just above.

A communication means 216 transacts with external devices and can be implemented by any of cable, wireless, light, infrared light and sound communication techniques. The controller unit 211, data recorder unit 212, display unit 213, data input unit 214 and communication control unit 215 are connected via a bus 217 for the traffic of data and control instructions.

Figure 13:
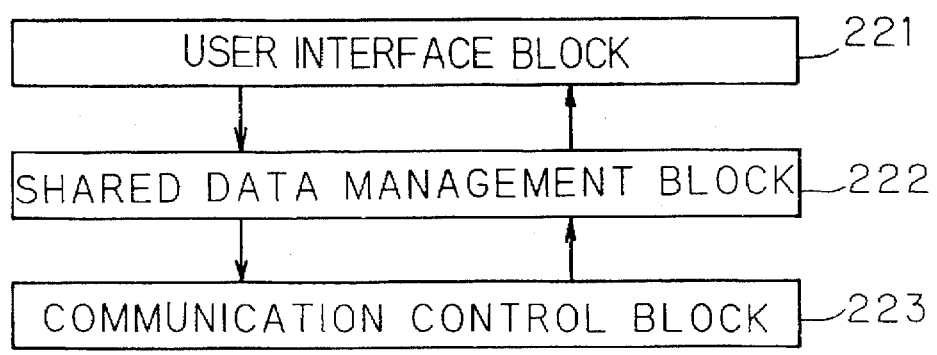
FIG. 13 shows an internal structure of a data program.

FIG. 13 shows the internal structure of a data-sharing program.

A user interface block 221 transmits user input data to a shared data management block 222 and displays the data received from the shared data management block 222.

The shared data management block 222 manages data that is shared. It transmits the new data prepared by the device of its own and modified data to the shared data management blocks 222 of the communication devices connected by the logical communication link through the communication control block 223.

The shared data management block 222 of the transmitting device adds the control instruction about how the data being transmitted should be dealt with at the receiving device and the information indicative of the kind of data and delivers the data to the communication control block 223.

In the shared data management block 222 of the receiving device analyzes the data received from said communication control block 223 and update the shared data with new data and/or modified data.

It also performs the management of the logical communication link such as issuance of an instruction to establish a logical communication link to designated communication devices or issuance of an instruction to cancel the logical communication link and the management of the data showing the correspondence of the logical communication link to the communication devices connected by said link.

The communication control block 223 adds the data for the logical communication link to the data received from the shared data management block 222 and transmits the data. It also receives the data addressed to the logical communication link which is being used by the device of its own, delete unnecessary data, and delivers the data to the shared data management block 222.

Figure 14:
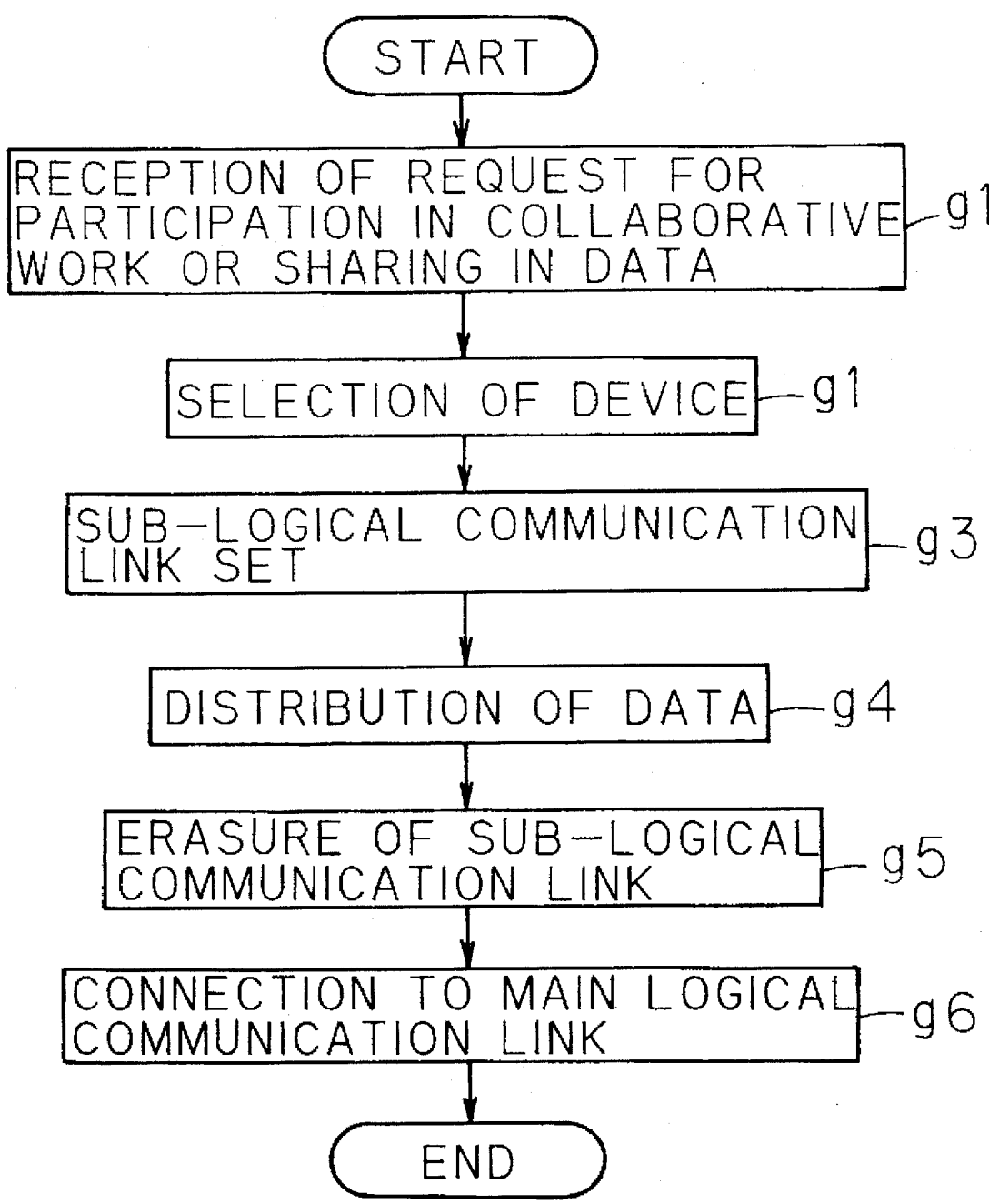
FIG. 14 is a flow chart showing a first method of data distribution.

A first data distribution method is now described with reference to the flow chart of FIG. 14.

It is first assumed that there exist communication devices A, B, C, and D and that these devices are connected by a logical communication link (hereinafter referred to as main logical communication link) M, have data in common, and are engaged in collaborative work. It is also assumed that a communication device E not connected via said main logical communication link M has made a connection request.

(Step g1)

The communication device E not connected by the main logical communication link M obtains the data in the communication devices engaged in collaborative work on a network through a control link which all the communication devices can communicate with and transmits a predetermined participation request signal to such communication devices, A, B, C, and D.

(Step g2)

Each of the communication devices A, B, C, and D receives the connection request from the communication device E and executes a processing for selection of a responding communication device.

A typical method of selecting the responding communication device is as follows. The respective devices transmit to one another the data indicative of the load on the CPU of their own controller units 211 and perform a comparison of load data. The communication device showing the smallest load in the above comparative evaluation is selected as the responding communication device and the respective devices transmit the results to one another for confirmation.

If any communication device is faulty or a trouble has developed in the main logical communication link, the particular communication device cannot transmit its load data so that it is not selected as the responding communication device.

For another example, the intrinsic identification numbers of respective communication devices can be utilized as data for evaluation. In this case, the communication device with the smallest identification number may be selected.

(Step g3)

The selected communication device (assumed here to be device B) establishes a new logical communication link (hereinafter referred to as sub-logical communication link) N between itself and communication device E.

(Step g4)

This communication device B transmits the shared data to communication device E utilizing said sub-logical communication link.

In case a plurality of shared data are to be transmitted, the order of transmission may for example begin with the data with the smallest management number among the shared data under management within the application.

(Step g5)

After transmission of the shared data, communication device B cancels the sub-logical communication link N to communication device E.

(Step g6)

The communication device E is now connected to the main logical communication link M.

In the above manner, the user can effect the distribution of shared data without setting a responding communication device beforehand. Moreover, the distribution of shared data can be carried out even when the membership connected to the logical communication link has changed or any of the communication devices has defaulted.

Embodiment 2

Figure 15:
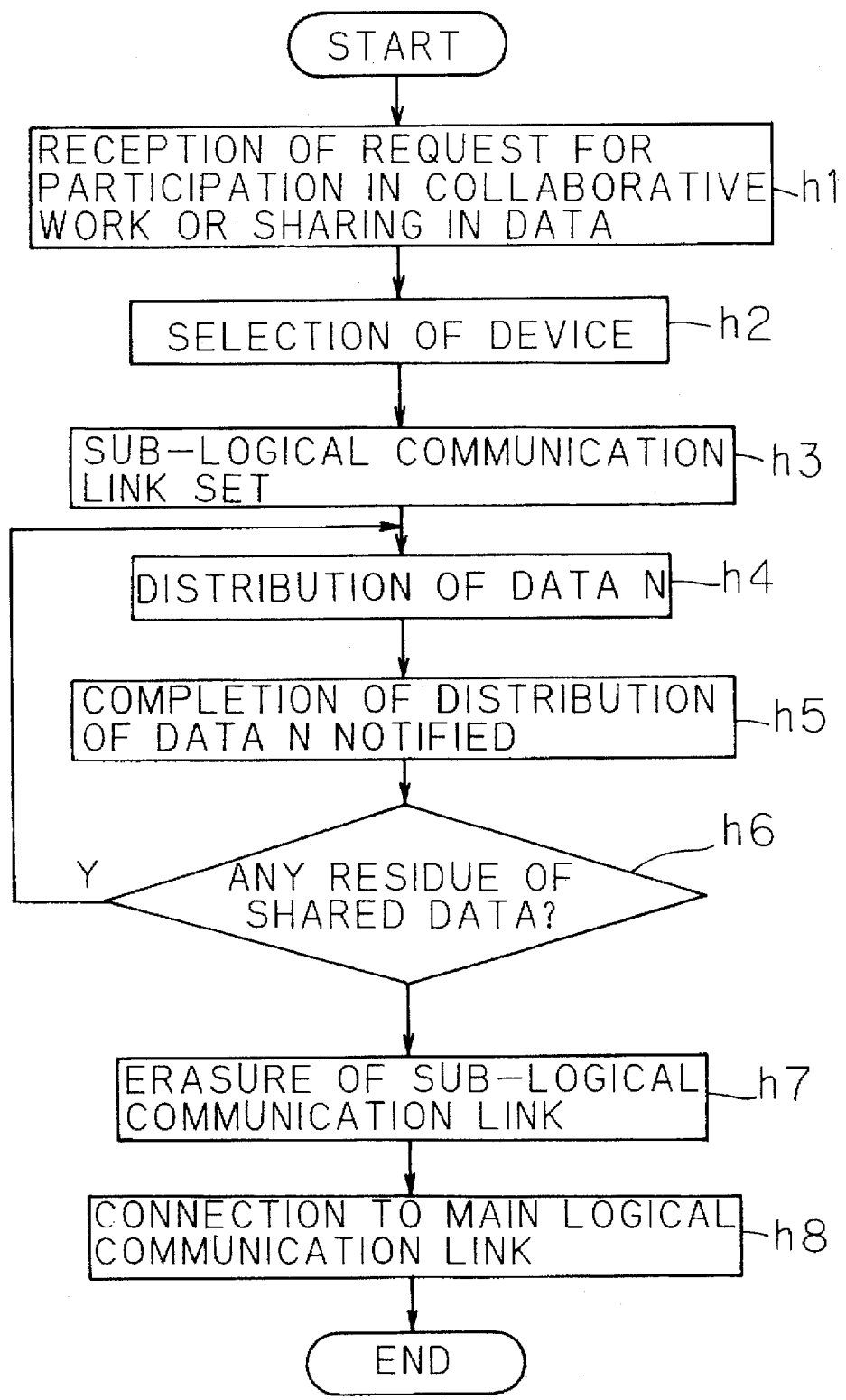
FIG. 15 is a flow chart showing a second method of data distribution.

A second method of data transmission is now described with reference to the flow chart of FIG. 15. The method is identical to the first method of data distribution up to Step g2 (Step h2) but the subsequent procedure, i.e. Step h3 et. seq., is different.

(Step h3)

The communication device B establishes a sub-logical communication link N to communication device E through a control communication link and determines the order of distribution of the shared data.

(Step h4)

Communication device B transmits one data to communication device E through the sub-logical communication link N.

(Step h5)

Each time it transmits one data to communication device E, communication device B prepares an Nth data transfer end data and transmits it in a multiple-address way to communication devices A, C, and D through main logical communication link M. Communication devices A, C, and D receive the data, extract the necessary message from the packet, and display it on the respective display units 213.

(Step h6)

Communication device B examines the number of remaining data which have not been transferred to communication device E and, if there is any residual data, performs the next data distribution.

(Step h7)

If there is no data to be distributed, the sub-logical communication link N is cancelled.

(Step h8)

Communication device E is connected to main logical communication link M.

Thus, by reporting the interim status of shared data distribution to other communication devices and causing the devices to display a necessary message on the respective display unit 213, the users can be informed of the current status of data distribution.

Embodiment 3

Figure 16:
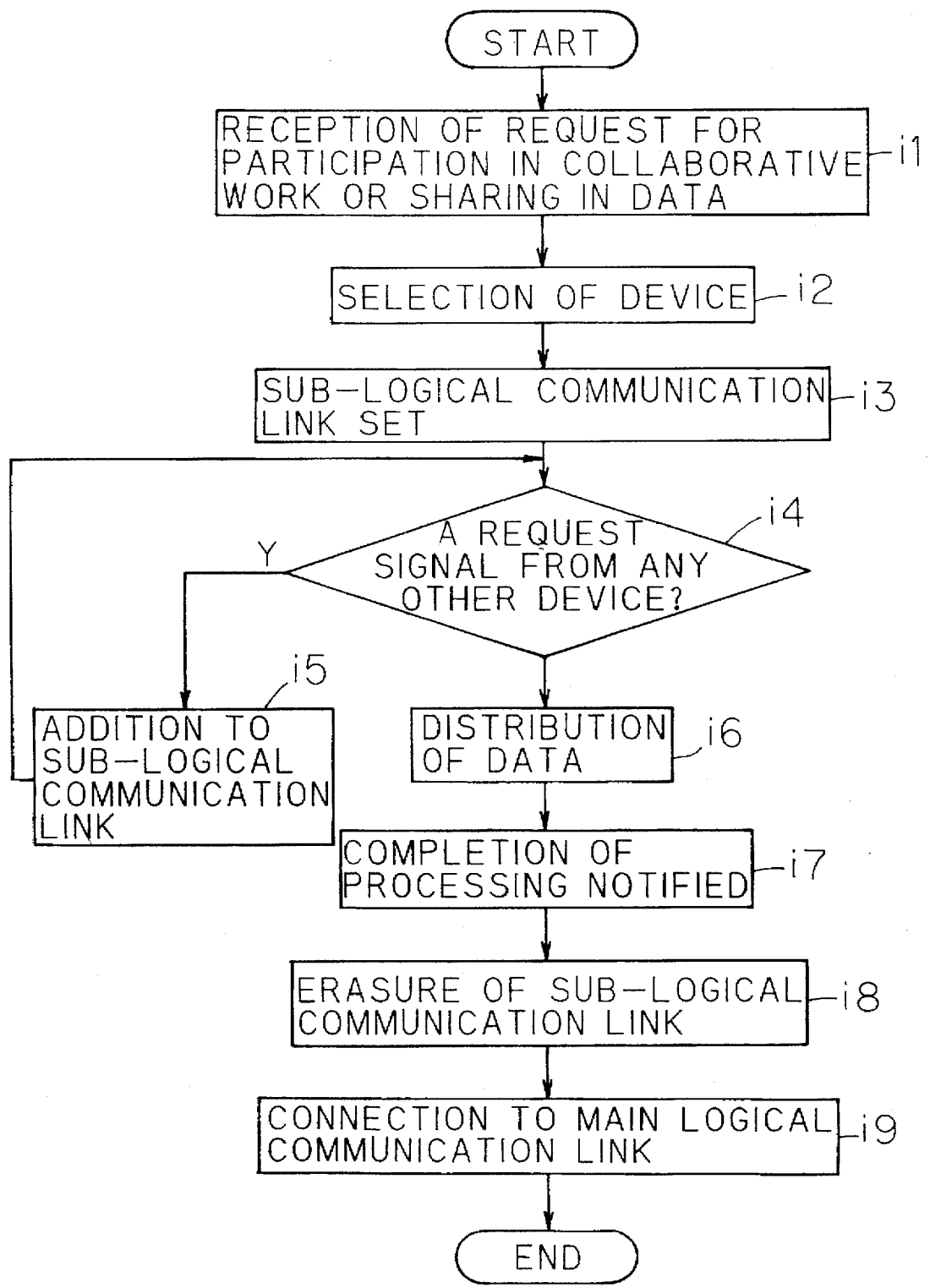
FIG. 16 is a flow chart showing a third method of data distribution.

A third method of data distribution is now described with reference to the flow chart of FIG. 16. The same procedure as that of the first method is executed up to Step g2 (step i2). Beginning with Step i3, a different procedure is executed.

(Step i3)

Communication device B constructs a sub-logical communication link N to communication device E through the control communication link.

(Step i4)

Communication device B checks to see whether a new connection request signal is transmitted from any device other than E during a predetermined subsequent time period.

(Step i5)

When a data sharing request signal transmitted in a multiple-address way is received from a new communication device F through the control communication link, the communication device F is added to the sub-logical communication link N through the control communication link.

(Step i6)

Then, it is checked again whether a new connection request is transmitted from a communication device during a predetermined time and in case there is no such request, the shared data are distributed in a multiple-address way to communication devices E and F through the sub-logical communication link N.

(Step i7)

Communication device B upon completion of the above step informs the communication devices A, C, and D to that effect in a multiple-address way.

(Step i8)

After the distribution of shared data, communication device B cancels the sub-logical communication link N.

(Step i9)

Communication device E and communication device F are connected to the main logical communication link M.

Thus, by checking for a new connection request after establishment of a sub-logical communication link and, when such a request is received, adding particular communication device to the established sub-logical communication link, data can be distributed concurrently to a plurality of communication devices.

Embodiment 4

Figure 17:
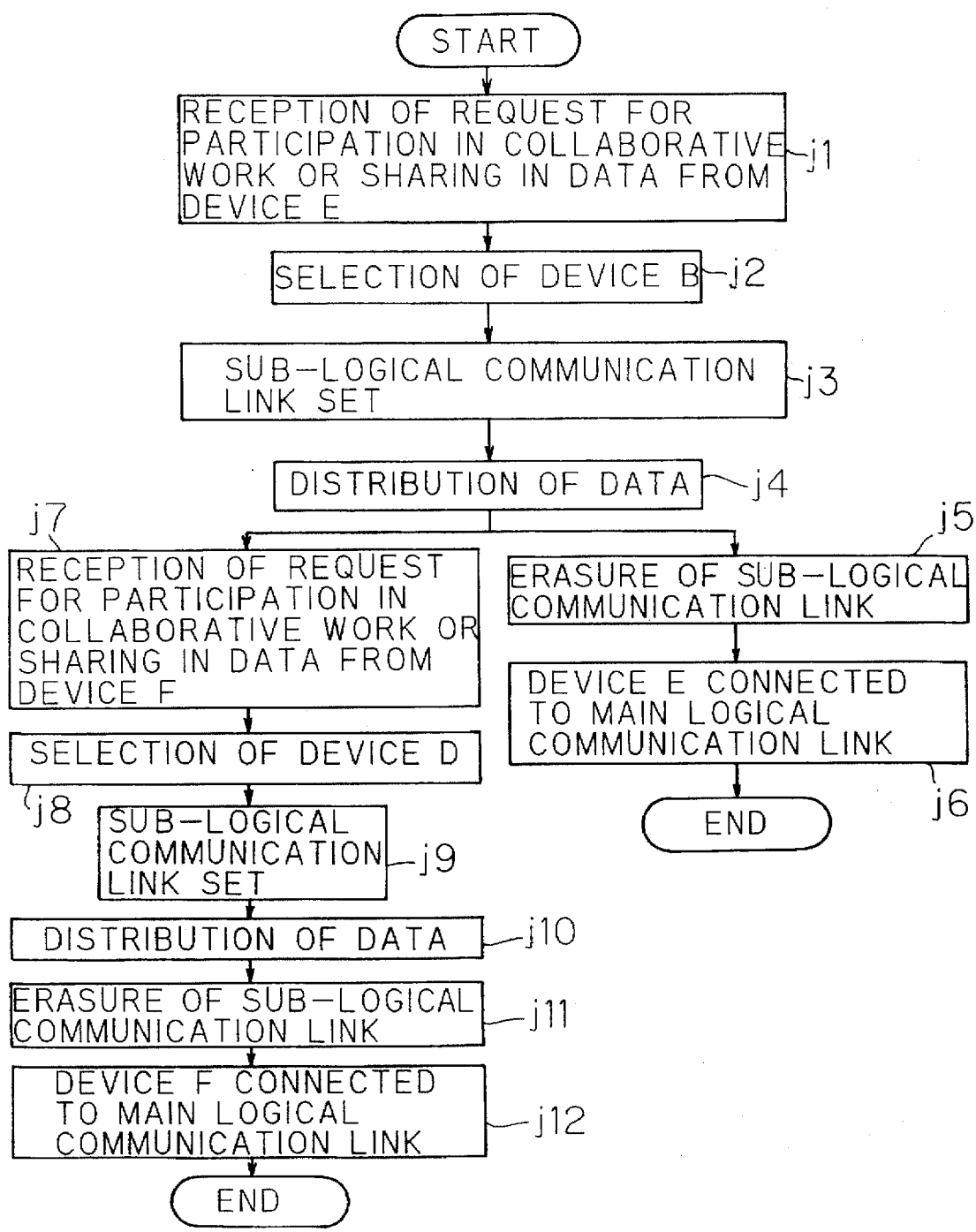
FIG. 17 is a flow chart showing a fourth method of data distribution.
Figure 18:
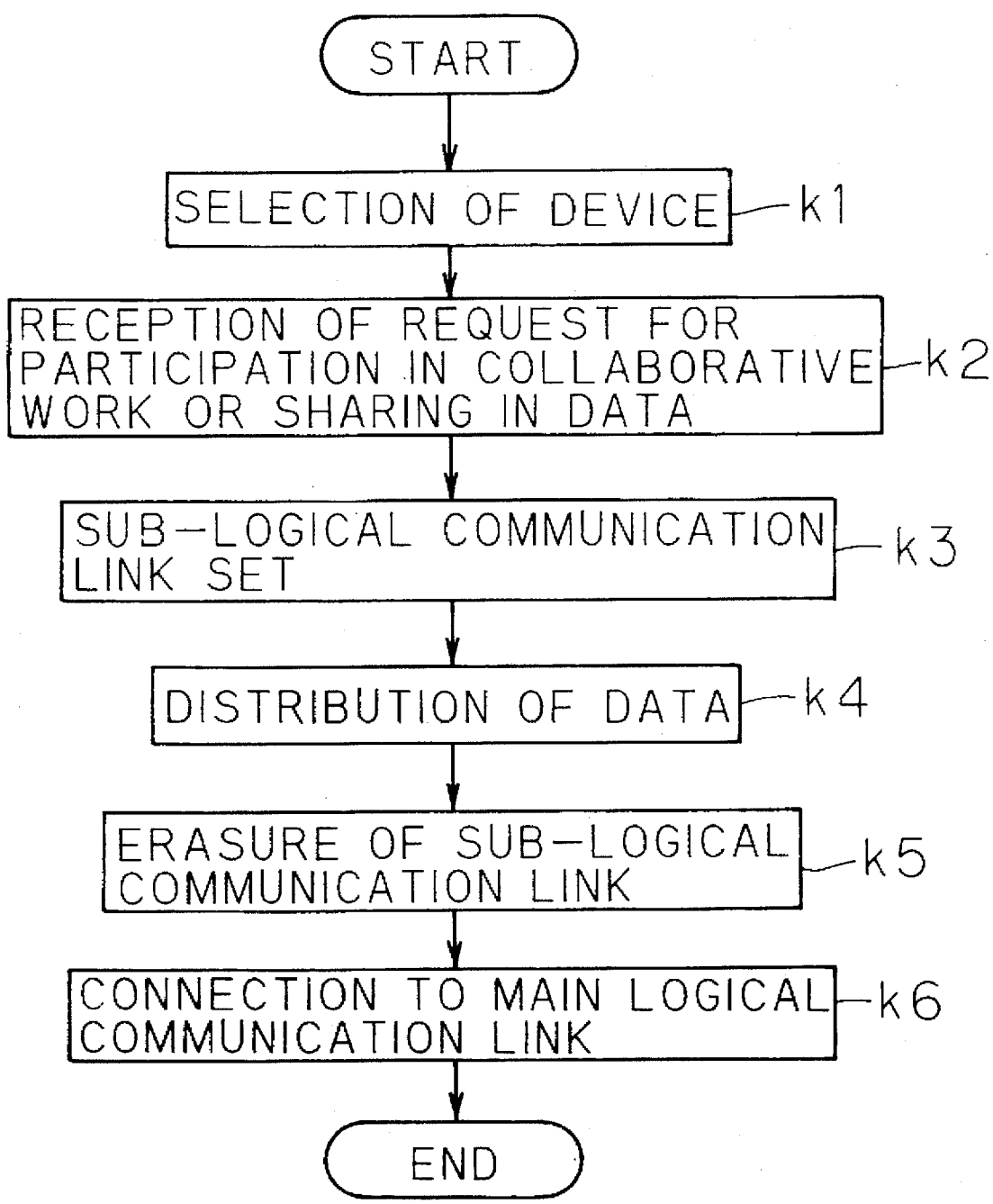
FIG. 18 is a flow chart of the conventional method of data distribution.

A fourth method of data distribution is now described with reference to the flow chart of FIG. 17.

(Step j1)

A data sharing request signal transmitted from communication device E, which is not connected by the main logical communication link M, through a control communication link is received by communication devices A, B, C, and D which are connected by main logical communication link M and have the same data in common.

(Step j2)

From among communication devices A, B, C, and D, a single specific communication device is selected by the method described above (the communication device so selected is assumed to be B).

(Step j3)

Communication device B constructs a sub-logical communication link N to communication device E through the control communication link.

(Step j4)

Communication device B distributes shared data to communication device E through the sub-logical communication link N.

(Step j5)

After the distribution of shared data, communication device B cancels the sub-logical communication link N to communication device E.

(Step j6)

Communication device E is connected to main logical communication link M.

(Steps j7 and j8)

If, during the distribution of data from communication device B to communication device E, communication devices A, B, C, and D receive a data sharing request signal from a new communication device F, which is not connected by main logical communication link M, through the control communication link, a communication device is selected by the method described above from among communication devices A, B, C, and D excluding device B which is distributing data (the selected communication device is assumed to be device D).

(Steps j9–j11)

The selected device D establishes a new sub-logical communication link L to communication device F, distributes the shared data to device F, and upon completion of data distribution, cancels the sub-logical communication link L. Then, communication device F is connected to the main logical communication link M.

Thus, when a plurality of connection are received concurrently, distribution of shared data is performed using a plurality of communication devices so that the efficiency of data distribution is increased compared with the conventional technique.

The fourth Invention

One embodiment of the fourth invention is now described with reference to FIGS. 19 through 31.

Figure 19:
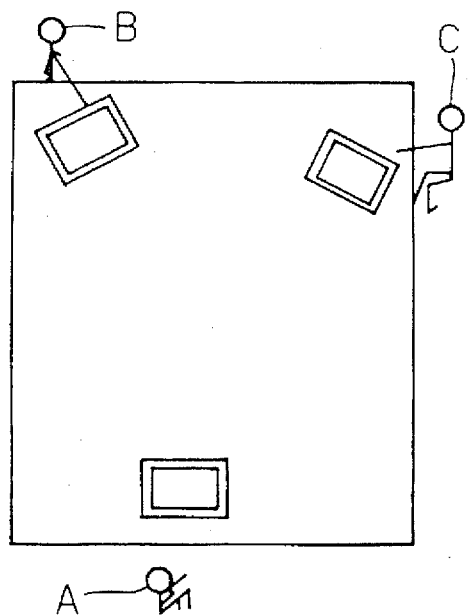
FIG. 19 is a schematic view illustrating the use of the communication device according to the fourth invention.

FIG. 19 shows the circumstances of a conference in which this embodiment can be effectively utilized.

The participants hold a meeting or conference, each using one or more portable data communication devices in a place of one's convenience.

Figure 20:
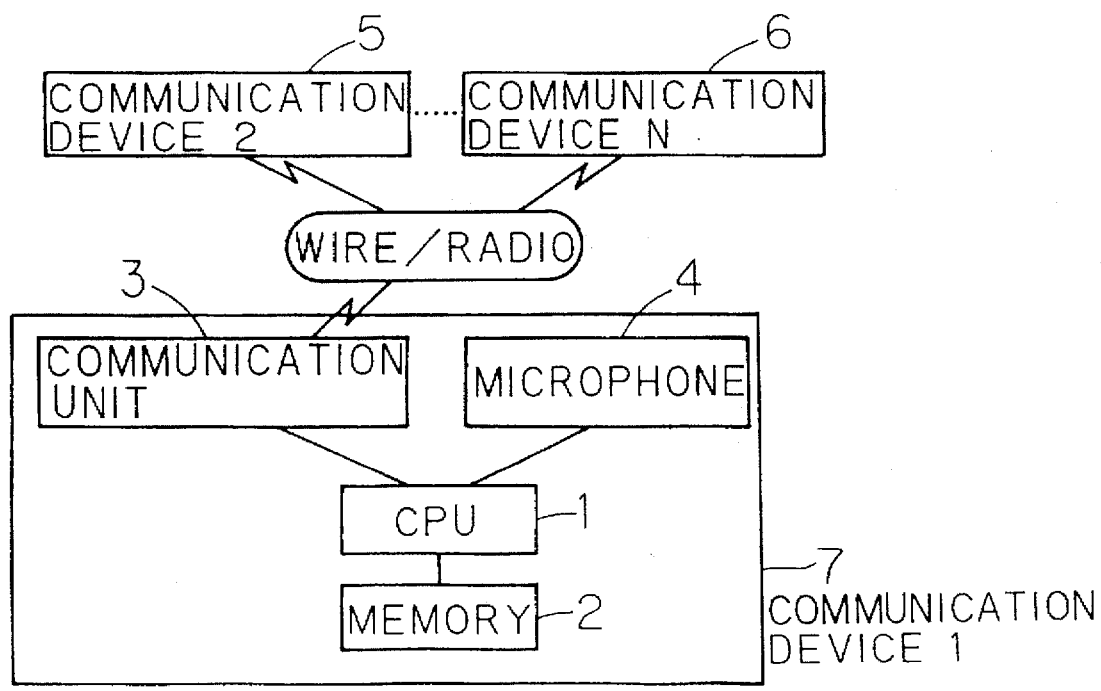
FIG. 20 is a block diagram of the data communication device.

FIG. 20 shows the arrangement of data communication devices 1, 5 and 6.

The communication device 1 comprises a CPU 1, a memory 2, a communication device 3, and a microphone 4 and is communicable with the other communication devices 5 and 6.

The mode of use of the above system is briefly described below.

Figure 21:
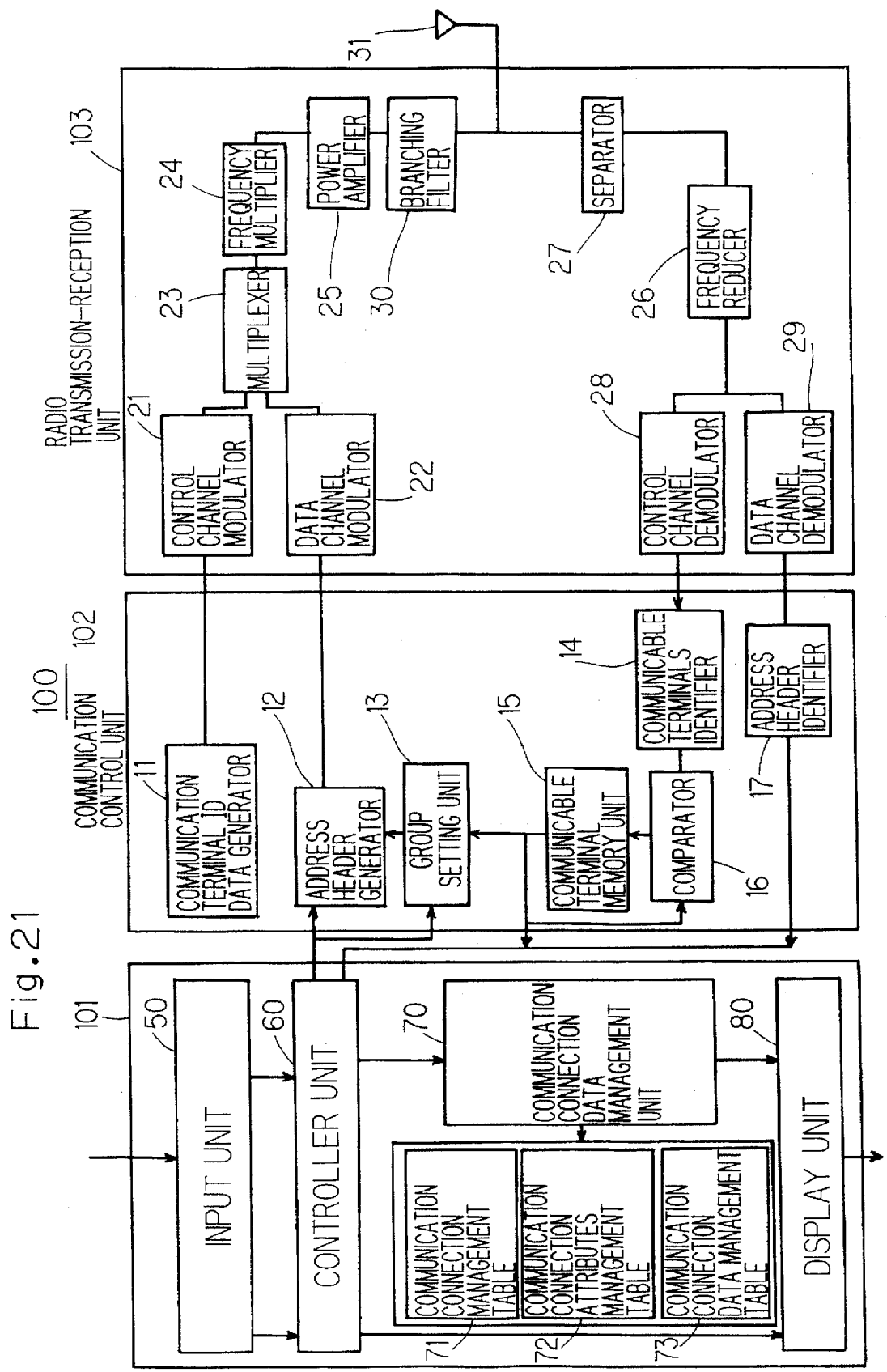
FIG. 21 is a block diagram of the communication control.

FIG. 21 is a block diagram of a communication control device 100. The communication control device 100 comprises a user input processor unit 101, a communication controller unit 102 and a radio transmission-reception unit 103. This communication control device 100 is used in the second through fourth inventions, too.

The user input processor unit 101 is a block which executes the so-called application, the communication controller unit 102 is a block which controls communications, and a radio transmission-reception unit 103 is a block which performs various processings for the radio transmission or reception of various control data generated from the communication controller unit 102 and data generated from the user input processor unit 101.

The transmission and reception modes of the communication control device 100 are now explained.

A communication terminal identification data generator 11 periodically generates its own communication terminal identification signal. This communication terminal identification signal is fed to a control channel modulator 21.

The user input is fed from the user input processor unit 101 to a destination header generator 12. A group designation data specifying the group to which the user input data is transmitted is simultaneously fed from the user input processor unit 101 to a group setting unit 13.

Based on the group designation data received, the group setting unit 13 outputs the identification data of the destination terminals belonging to the group to the destination header generator 12.

The destination header generator 12 adds the destination terminal identification data as a header to the user input data and outputs the data to the data channel modulator 22.

The data channel for transmitting data signals and the control channel for transmitting control signals are separated from each other by, for example, frequency division. The data channel modulator 22 and the control channel modulator 21 perform modulations according to the respective channels.

The signal outputs from the data channel modulator 22 and control channel modulator 21 are respectively multiplexed in a multiplexer 23, frequency-converted to high-frequency signals by an frequency multiplier 24, amplified by a power amplifier 25 to a suitable power, and transmitted in a multiple-address way from an antenna 31 through a branching filter 30.

On the other hand, various high-frequency signals from other stations as received by an antenna 31 are respectively passed through a branching filter 30, converted to base band signals in a frequency reducer 26, separated in a separator 27, and fed to a control channel demodulator 28 and a data channel demodulator 29, whereby they are demodulated to the control data or user input data.

The user input signal output of the data channel demodulator 29 is examined for the destination header added to the user input in an addressee header identifier 17 to see whether the received user input data is addressed to the station of its own. If the device of its own is the destination, the received user input data is applied to the user input processor unit 101. If it is not addressed to the station of its own, the data is discarded.

The transmission of the self-station identification number and the transmission and reception of user input data between one's own station and other terminals established as a group are carried out in the above manner.

The group is established in the following manner.

As mentioned above, the communication terminal identification signal generated by the communication terminal identification data generator 11 is periodically transmitted from the antenna 31 through the radio transmission-reception unit 103.

On the other hand, the communication terminal identification data from other communication terminals are received by the antenna 31 and converted to base-band signals through a branching filter 30 and a frequency reducer 26. Then, the control channel signal is separated in a separator 27 and applied to the control channel demodulator 28.

From the control channel demodulator 28, the communication terminal identification data obtained by a predetermined demodulation is applied to the communicable terminal identifier 14.

The communicable terminal identifier 14 renders a judgement of communicability with a particular terminal when the received control data contains the relevant communication terminal identification data and this signal is repeatedly received within a predetermined time, and outputs the communication terminal identification data to a comparator 16 and a communicable terminal memory 15.

The comparator 16 compares the input signal from the communicable terminal identifier 14 with the communication terminal identification data stored in the communicable terminal memory 15 and, according to the result of comparison, outputs a control signal to the communicable terminal memory 15. When an agreement is found by the comparison, it is not necessary to rewrite the contents of the communicable terminal memory 15, so that there is no control signal output from the comparator 16 to the communicable terminal memory 15. On the other hand, when the comparison shows a disagreement, the comparator 16 outputs a control signal to update the contents of the communicable terminal memory 15.

Thus, as portable communication devices each equipped with the communication control device 100 approach to each other and their radio transmission waves come to be received at an electric field intensity not less than a threshold level, the communication terminal identification data transmitted periodically is received so that this terminal identification data is written in the communicable terminal memory 15.

The contents of the communicable terminal memory 15 are available to the user input processor unit 101 and the group setting unit 13.

The user input processor unit 101 selects one or more parties from among the communicable terminals presented by the communicable terminal memory 15 and outputs a setting instruction signal to the group setting unit 13.

The group setting unit 13 in compliance with this setting instruction signal prepares and holds a table of the terminal identification data presented by said communicable terminal memory 15 as correlated with the group set.

In this manner, a logical communication link is established between communication terminals belonging to the group. The term "logical communication link" means a link established by setting selected communication terminals which are mutually communicable into a group and connecting the terminals belonging to this group in communicable relation without specific operation or processing on the part of the user.

The communicable terminal identifier 14 also enquires whether the identification data for the communication terminals memorized by said communicable terminal memory 15 are periodically received or not, and if any of the terminal identification data ceases to be received within a predetermined time, renders a judgement of non-communicability to delete the particular terminal from the communicable terminal memory 15.

When the user input processor unit 101 transmits data, it outputs the transmission user input data to the destination header generator 12 as mentioned above and, at the same time, outputs a signal designating the group relevant to the destination to the group setting unit 13 so that the user input data is transmitted selectively and in a multiple-address way to the communication terminals belonging to the group.

Thus, portable communication devices having the above-described communication control function become mutually communicable upon coming sufficiently close to each other so that a logical communication link can be readily established with any desired party regardless of its specific location. The established communication link is automatically erased when the portable communication devices move away from each other and become mutually non-communicable. Since a communication link can be established only by bringing the devices sufficiently close to each other, it is unnecessary to preset the address number of the other party. Thus, the necessary communication link can be easily established even when the other party is not an aquainted person. Furthermore, since multiple-address communications are feasible, a concurrent connection service can be provided for a plurality of communication devices.

The procedure for calculating the above layout of communication devices on the occasion of a meeting or a conference is described below.

It is assumed that the participants have their data communication devices and each of the devices is equipped with a microphone. For explanation's sake, a three-party conference is contemplated.

[1]

As illustrated in FIG. 19, there are 3 persons, namely A, B, and C (The distance between each participant and his communication device can be disregarded because the device is generally located within reach of the participant for ease of manipulation).

The signals obtained by recording the utterance of party A at the communication devices A, B, and C are expressed as S (A, t), S (B, t), and S (C, t), respectively (t stands for time point).

Since the sound wave travels generally at a speed of 340 m/sec., the communication device located near the speaker A records the acoustic signal earlier than the communication device located at a greater distance.

Using the above-mentioned acoustic signals, the distance relationship among the three communication devices is calculated by the following alternative methods (1)–(3).

(1) Determining the distance by utilizing the city block distance

With the phase difference of acoustic signals being taken as ToAB, the distance is calculated by means of the following equation.

$$d(A, B, TAB) = sum[abs\{S(A, t) - S(B, t+TAB)\}]$$

where sum represents an operation for calculating the sum for the recorded time and abs represents an operation for calculating the absolute value.

This d(A, B, TAB) is calculated to find ToAB giving the minimum value of d(A, B, TAB) for change in TAB. From this value, the distance DAB between A and B can be calculated as follows.

$$DAB = ToAB \times SND$$

where SND is the sound speed which can be generally regarded as 340 m/sec. for computation.

For example, where ToAB=3 msec., the distance between A and B can be found to be DAB=1 m, approx. The distance between A and C, viz. DAC, can also be calculated in the same manner.

The distance between B and C, viz. DBC, can be determined when either B or C has made an utterance.

Since the distances among the three parties can thus be calculated, the topological relation of the three points can be determined. Therefore, this 3-point topological relation can be expressed as a layout of the communication devices.

(2) Determining the distance by utilizing the Euclid distance

Taking the phase difference of acoustic signals as ToAB, an operation is performed using the following equation.

$$d(A, B, TAB)^{}2 = sum[\{S(A, t) - S(B, t+TAB)\}^{}2]$$

Then, in the same manner as described above, using the minimum value of d(A, B, TAB) as ToAB, the following equation is calculated.

$$DAB = ToAB \times SND$$

(3) The following correlation value representing the degree of similarity is used in lieu of distance.

The following equation is calculated.

$$s(A, B, TAB) = \text{sum}\{S(A, t) \times S(B, t+TAB)\}$$

Thus, ToAB can be calculated by determining the maximum value of s(A, B, TAB) instead of the minimum value.

Figures 23, 24:
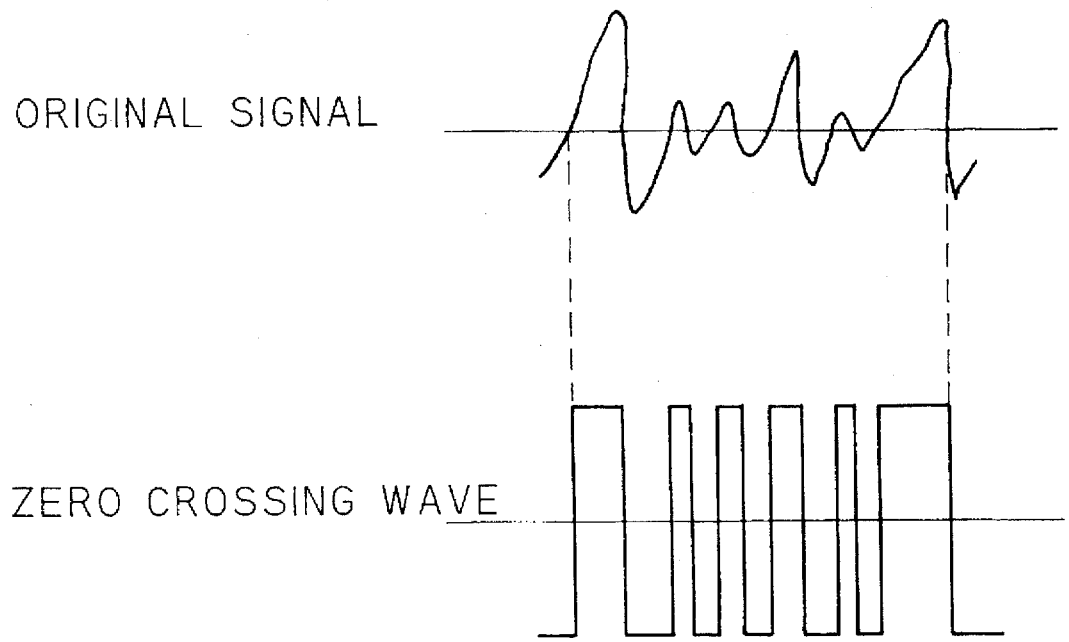
FIG. 23 is a diagrammatic representation of the zero crossing wave.
FIG. 24 shows a table of stored distance data.

In this case, to adjust for amplitude, the calculation can be made after transform to zero crossing wave in lieu of S(m, t). A typical zero crossing wave is shown in FIG. 23.

The detailed procedure is now described with reference to the flow chart of FIG. 22. This flow chart pertains to the processing in communication device A among devices A, B, and C.

(Step a1)

A sound signal is detected. Here, generation of an acoustic signal can be assumed when the energy value calculated over a given signal interval has exceeded a predetermined threshold. The energy En value can, for example, be calculated as follows.

$$En = \text{sum}[abs\{S(n, t)\}]$$

$$En = \text{sum}\{S(n, t)**2\}$$

(n represents the numbers of the communication devices which are B and C).

The sum value in this case is calculated for a predetermined interval of the acoustic signal, for example 10 m seconds.

If the interval is judged as a soundless one, the same calculation is repeated after a predetermined time (for example, 1 m second), waiting for the start of sound.

(Step a2)

When a judgement of "sound" is made, the acoustic signal with a length of L seconds (a few m seconds~a few tens of m seconds) as stored in the memory 2 and the starting time-point Tn are recorded.

(Step a3)

The recorded acoustic signal and the corresponding starting time-point data are transmitted to the other communication devices B and C.

(Step a4)

The procedure advances to Step a5 when a judgement of "sound" was made immediately after the beginning of processing and to Step a6 when there was a soundless interval after the beginning of processing and, then, a sound interval followed.

(Step a5)

Distance calculations are carried out by any of the methods (1) through (3) to determine ToAn values.

If these distance values are not sufficiently small, the procedure is repeated from the beginning.

(Step a6)

When there was a soundless interval after the beginning of processing and, then, a sound interval followed, the following procedure is carried out. Since the same sound was recorded by all the communication devices, d(A, n, ToAn) is calculated for verifying the sameness of sound to confirm that is below a certain threshold. The zero crossing wave may be used for this procedure. When this condition is satisfied, the procedure advances to Step a8. If it is not satisfied, the procedure returns to Step a1 for reprocessing.

(Step a7)

Since the same sound has been recorded by all the communication devices, the differences in time-point can be used to calculate ToAn. Thus, $$ToAn = abs(TA - Tn)$$

Then, the procedure advances to Step a8.

(Step a8)

Using ToAn thus found, the distance between communication device A and communication device n can be calculated as follows.

$$DAn = ToAn \times SND$$

This DAn value is stored in the memory.

(Step a9)

The above procedure is carried out until the distances DAn to all the communication devices that can be measured from communication device A have been determined.

(Step a10)

The same procedure has been performed in communication devices B and C as well. Therefore, such distance data are exchanged with those of communication device A. By this exchange, the distances among all the communication devices can be determined.

FIG. 24 is a table prepared by determining the distances among communication devices where number of devices is N.

While the above calculations are carried out by all the communication devices in the above example, the calculation work may be assigned to some of the communication devices only if all the Dmn values in the table can be calculated. In the above case, the duty may be assigned to two of the three communication devices A, B, and C. As to the method of assigning the duty, devices with comparatively smaller processing loads can be employed for instance.

The method of determining a display of the inter-device distances thus calculated is now described.

Using the table of FIG. 24, the positions of the respective communication devices are plotted two-dimensionally.

Assuming that the topographical coordinates of communication device m are assumed to be (xm, ym), the following simultaneous equation is obtained.

$$(xm-xn)2 + (ym-yn)2 = a \times Dmn**2$$

(where m>n; m, n=1~N; N represents the number of communication devices). By solving this simultaneous equation, the topological relationship can be determined. In the above equation, a is a reduction constant for presentation on the display screen.

In the communication device which displays the layout, the position of the device of its own can be taken as the origin. Thus, the layout at communication device m is calculated using (xm, ym)=(0, 0). For a definite establishment of positions, the direction of a suitable point must be tentatively determined beforehand. For this purpose, another communication device is selected. This selection can be made randomly or the device n giving the minimum or maximum value of Dmn may be selected. And on the premise that the coordinates of this communication device n lie on the x-axis (xn, 0), the above equation is solved.

In this manner, generally a combination of 4 different solutions symmetrical in quadrants about the origin is obtained. By the above procedure, a layout representing the topological relationship of communication devices can be calculated.

The relative positions of communication devices can be established in the above manner but in order that they can be displayed, it is necessary to reflect the final arrangement of the actual communication devices. Therefore, in order that the candidates obtained may reflect their absolute positions, the candidates are displayed and the help of the device users is enlisted to point out the actual position.

Figure 25:
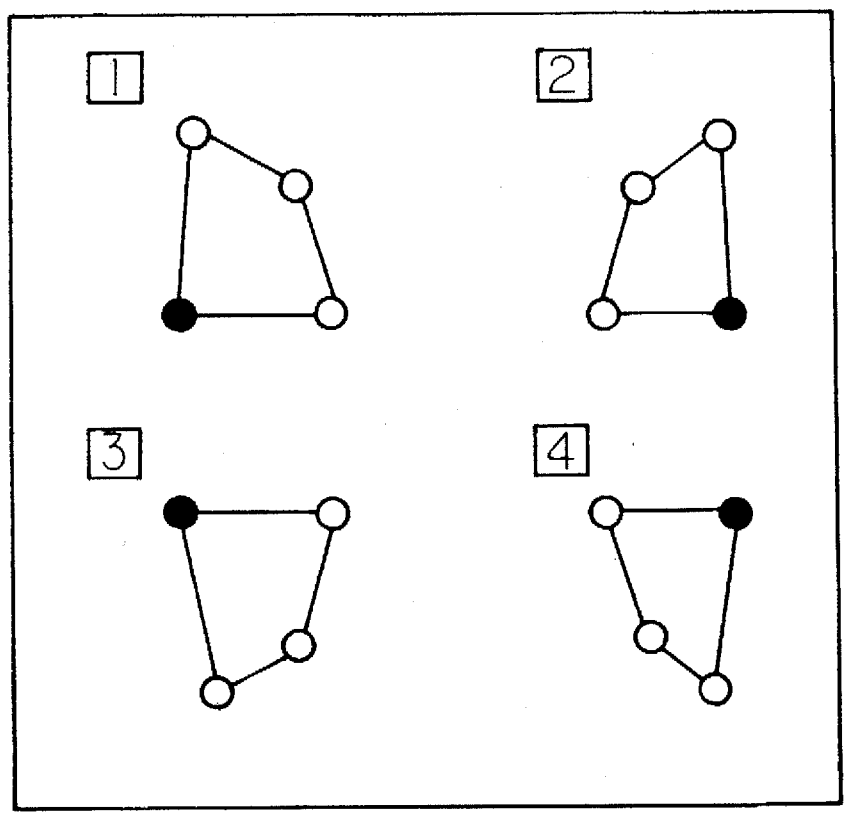
FIG. 25 is a diagram showing a typical layout selection display.

For example, the four layout candidates shown in FIG. 25 are displayed and the user is asked to point out his position by pen or mouse input or by designation of the number added. In this manner, the definite positions can be finally established. The closed circle represents the communication device of its own.

The procedure is not restricted to the four candidates mentioned above but the layout obtained by rotating them by 45° may be additionally used for selection.

In the case of a conference, the participants talk face-to-face, candidates with many positive y-coordinate values can be used for selection.

The rotation mentioned above can be made by the well-known homographic transformation. Thus, the new coordinates (X, Y) after counterclockwise rotation of the coordinates (x, y) through $\alpha°$ can be determined by the following equations.

$$X = x \cos \alpha - y \sin \alpha$$

$$Y = x \sin \alpha + y \cos \alpha$$

As an alternative method for display comprises sequential display of the layout computation process. Thus, while Dmn is sequentially determined in the above layout calculation procedure, each calculated Dmn is subjected to the above display calculation and the result is sequentially displayed.

Figure 26:
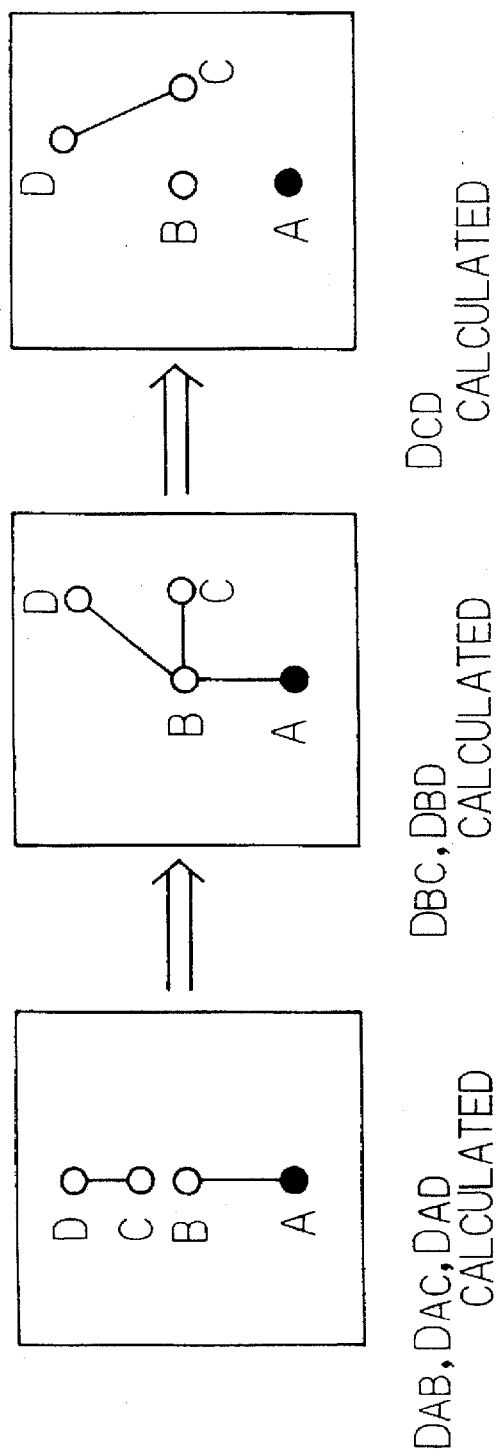
FIG. 26 is a diagram showing an example of sequential layout display.

As shown in FIG. 26, the status prevailing when the distance from a given communication device has just been determined is first displayed and every time the distance to another device has been determined, the status currently prevailing is displayed.

Of course, these coordinates calculations can be performed at a given communication device and the results transmitted so that the receiving communication device may rotate the coordinates about its own origin for display or can be performed independently at each communication device.

A typical final display of the layout at each device is shown in FIG. 27.

In this manner, the party to which a document should be distributed in a consultation or the party to a secret conversation can be easily designated by pen input or mouse or other means, regardless of whether said party is singular or plural.

[2]

In the above embodiment, the layout is calculated based on the voices of users. However, many of the recent portable communication devices are equipped with a speaker means. The following description pertains to another embodiment in which such devices can be utilized.

As a principle, the layout is calculated based on active acoustic emissions such as the sound of a buzzer or music from the speaker means of the system in lieu of human voices.

Figure 28:
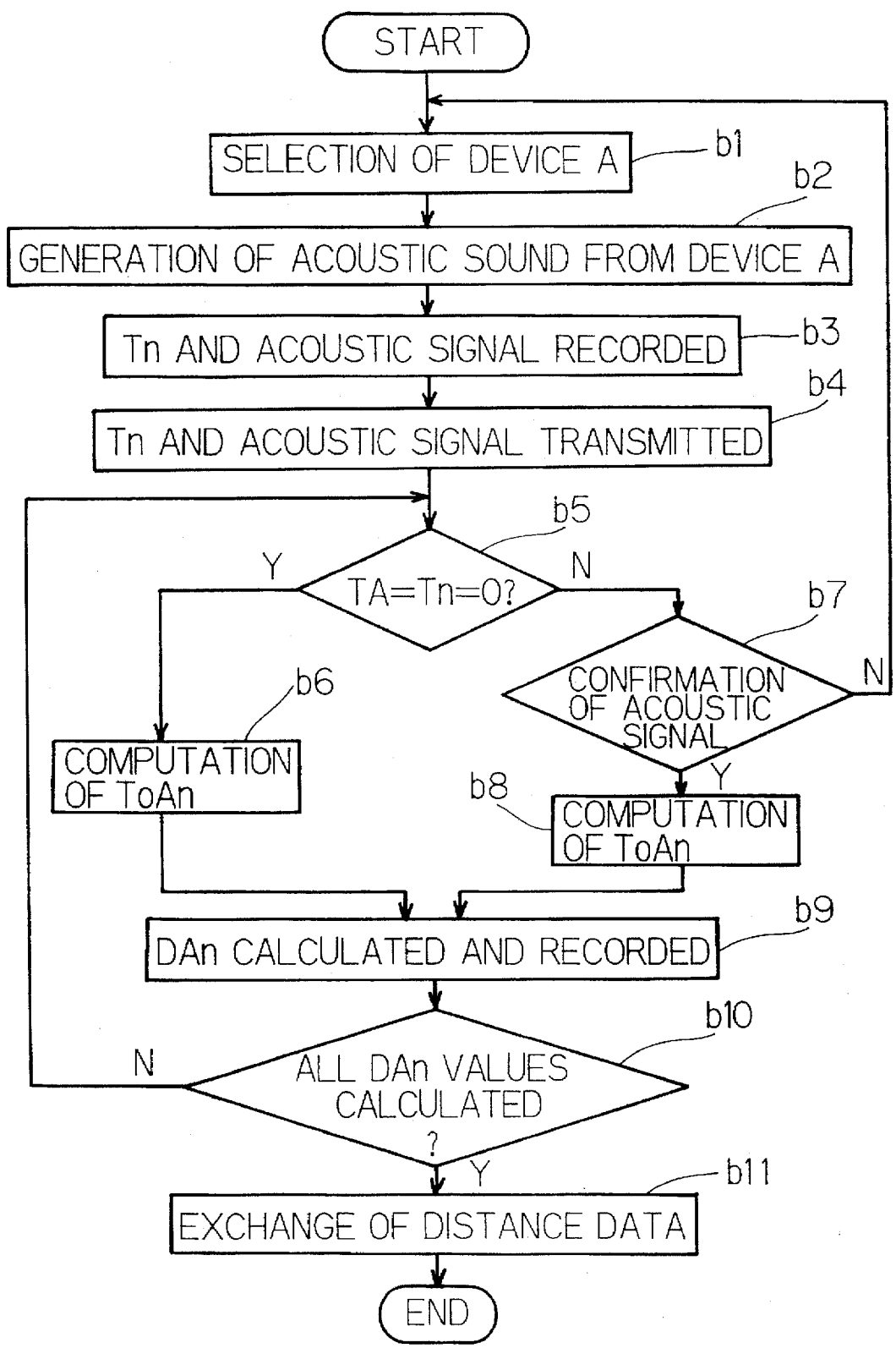
FIG. 28 is a flow chart of the operation for processing distance data according to signal sound.

The flow chart of this embodiment is shown in FIG. 28.

(Step b1)

After initiation of operation of the system, with the adjustment of the microphone 4 being ready for input at all communication devices, a communication device A which is to emit an acoustic sound is selected.

(Step b2)

The speaker-equipped communication device A so selected is caused to emit an acoustic sound. In this manner, an acoustic sound is available in lieu of the human voice used in the preceding embodiment.

Figure 22:
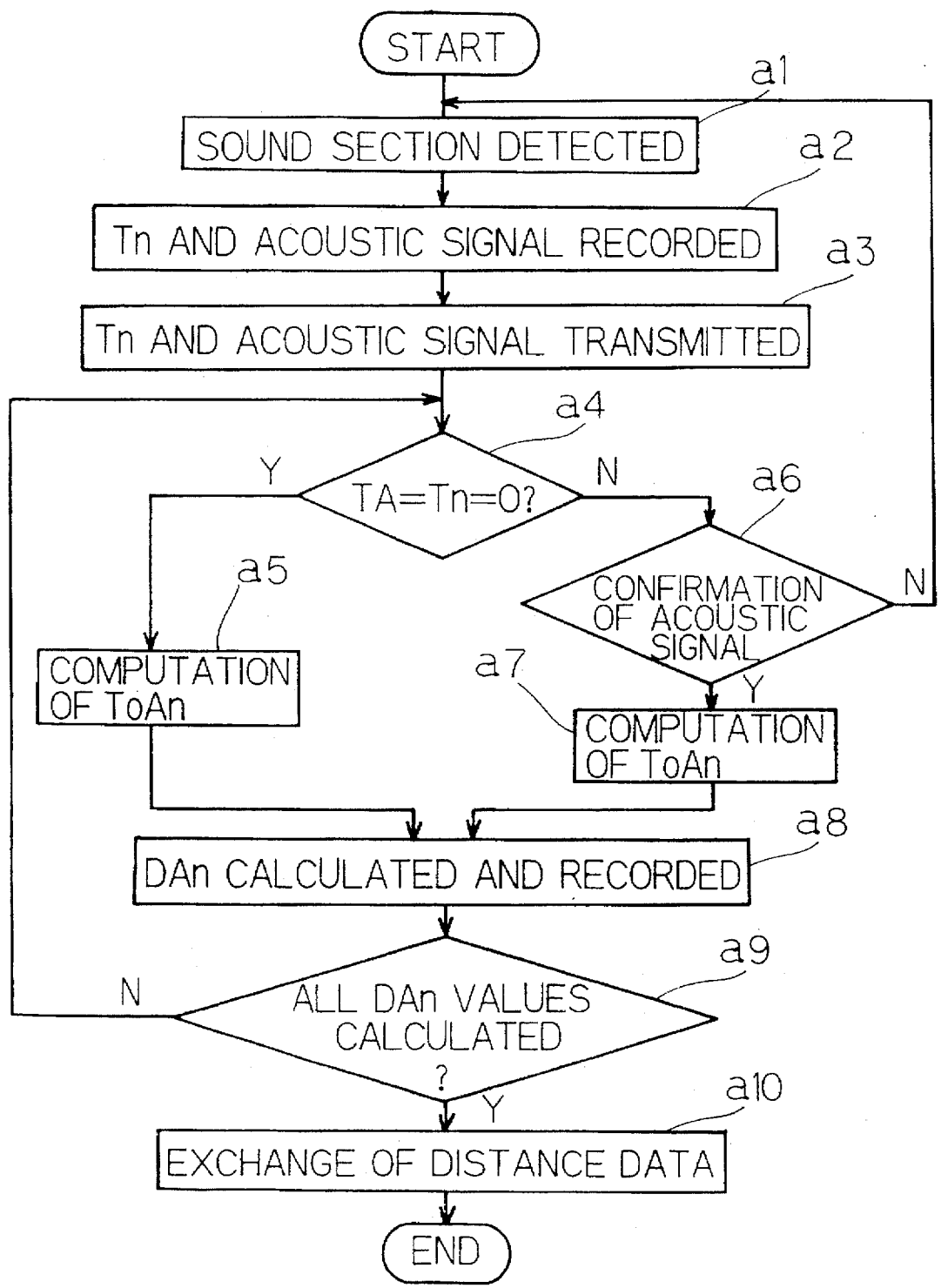
FIG. 22 is a flow chart showing the operation of distance data.

The subsequent procedure can be identical with that shown in Step a3 et. seq. in FIG. 22 and, therefore, is not explained.

[3]

The method of calculating the distance between communication devices by utilizing the power of an acoustic signal is now described.

Thus, the power of an acoustic signal with a duration of L seconds (several m sec.~several tens of m sec.) at communication device n is calculated by means of the following equation.

$$En = \text{sum}\{S(n, t)^{**}2\}$$

Where sum is the sum for duration L (sec.) with regard to t.

Figure 29:
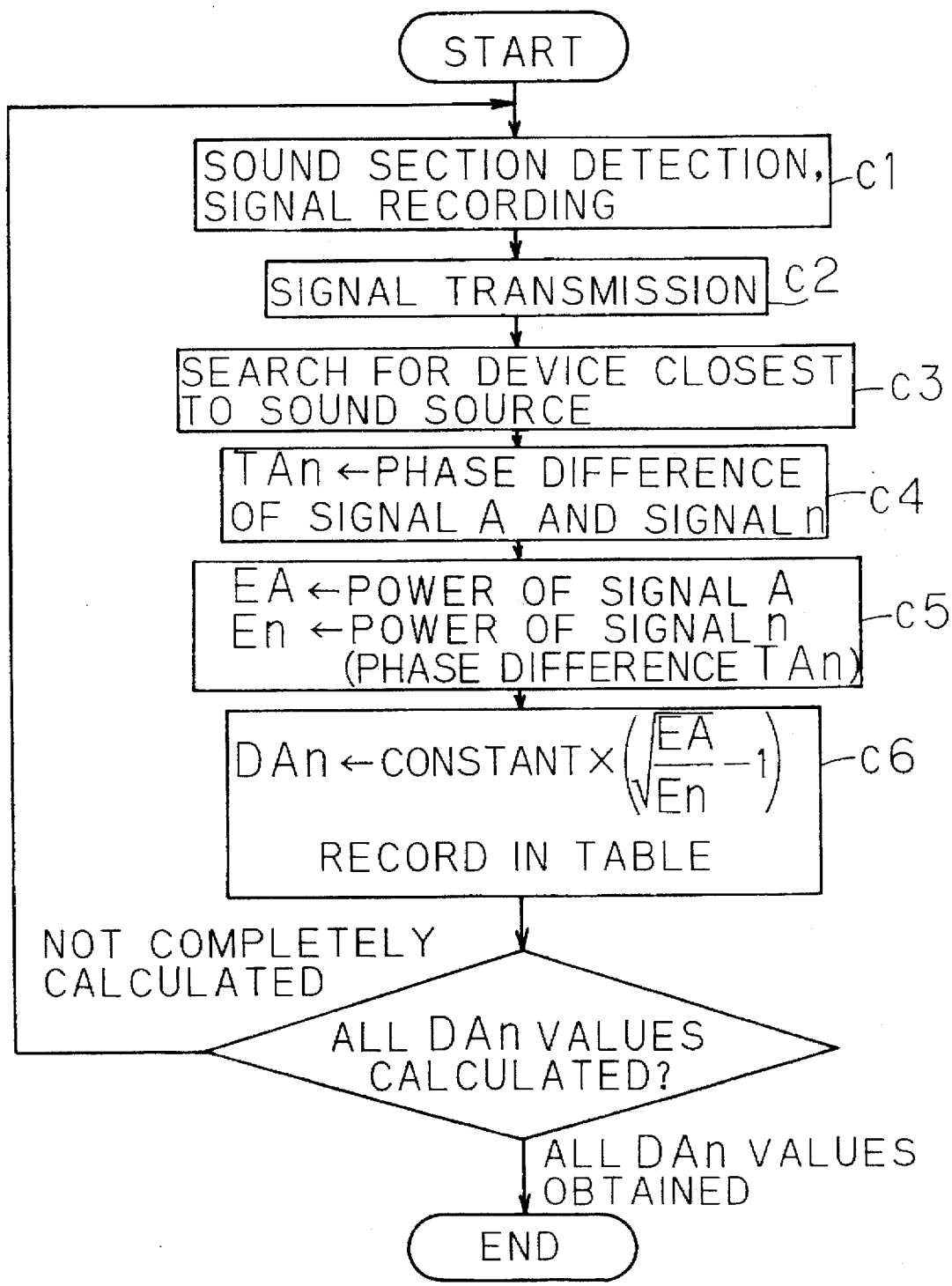
FIG. 29 is a flow chart of the operation for processing distance data according to signal power.

This processing is carried out in accordance with the flow chart of FIG. 29.

The procedure of Step c1 to Step c2 is similar to the procedure of Step a1 to Step a3 in FIG. 22, and the procedure of Step c3 et. seq. (method for calculating inter-device distances) is different.

(Step c3)

The closest communication device, that is one's own communication device, is evaluated. This is done by searching for Tn having the smallest value.

(Step c4)

To calculate the power with regard to the same portion of speech, the calculation is performed after the adjustment for phase difference by the procedure described for explaining the principle of layout calculation.

Thus, the following equation is calculated and ToAB giving the minimum value is determined.

$$d(A, B, TAB) = \text{sum}[abs\{S(A, t) - S(B, t+TAB)\}]$$

(Step c5)

To calculate the power of B, the power calculation is carried out as follows.

$$EB = \text{sum}\{S(B, t+TAB)^{**}2\}$$

In this manner, the phase distortion is corrected and En(n=A~C) is calculated for all the communication devices. These are powers of the same signal as observed at different locations.

(Step c6)

Since generally the power of a sound radiated from a point sound source is inversely proportional to the square of the distance from the sound source, the following relation holds.

$$DAn = DoA \times \{sqrt(EA/EN) - 1\}$$

Where DoA is the distance from the sound source to the communication device of its own. DoA through DoC can be calculated using a constant distance value, for example 30 cm. (sqrt represents an operation for calculating a square root.)

When $En = \text{sum}[abs\{S(n, t)\}]$ is used as En, sqrt may be omitted in the calculation of DAn.

In the above example pertains to the determination of a two-dimensional position of, for example, a desk but it is of course possible to determine a three-dimensional layout. In such a case, a bird's eye view or vertical section layout display can be utilized.

[4]

The sound playback function is now described.

The means for calculating the topological relationship of communication devices is the same as that already described. Thus, it is assumed that a table of inter-device distances as shown in FIG. 24 is available. The sound recording system using this table for a conference or consultation is now explained.

By this system, the relative amount of unwanted data such as noise is decreased by correcting for the phase difference of sound data recorded at different locations.

Figure 30:
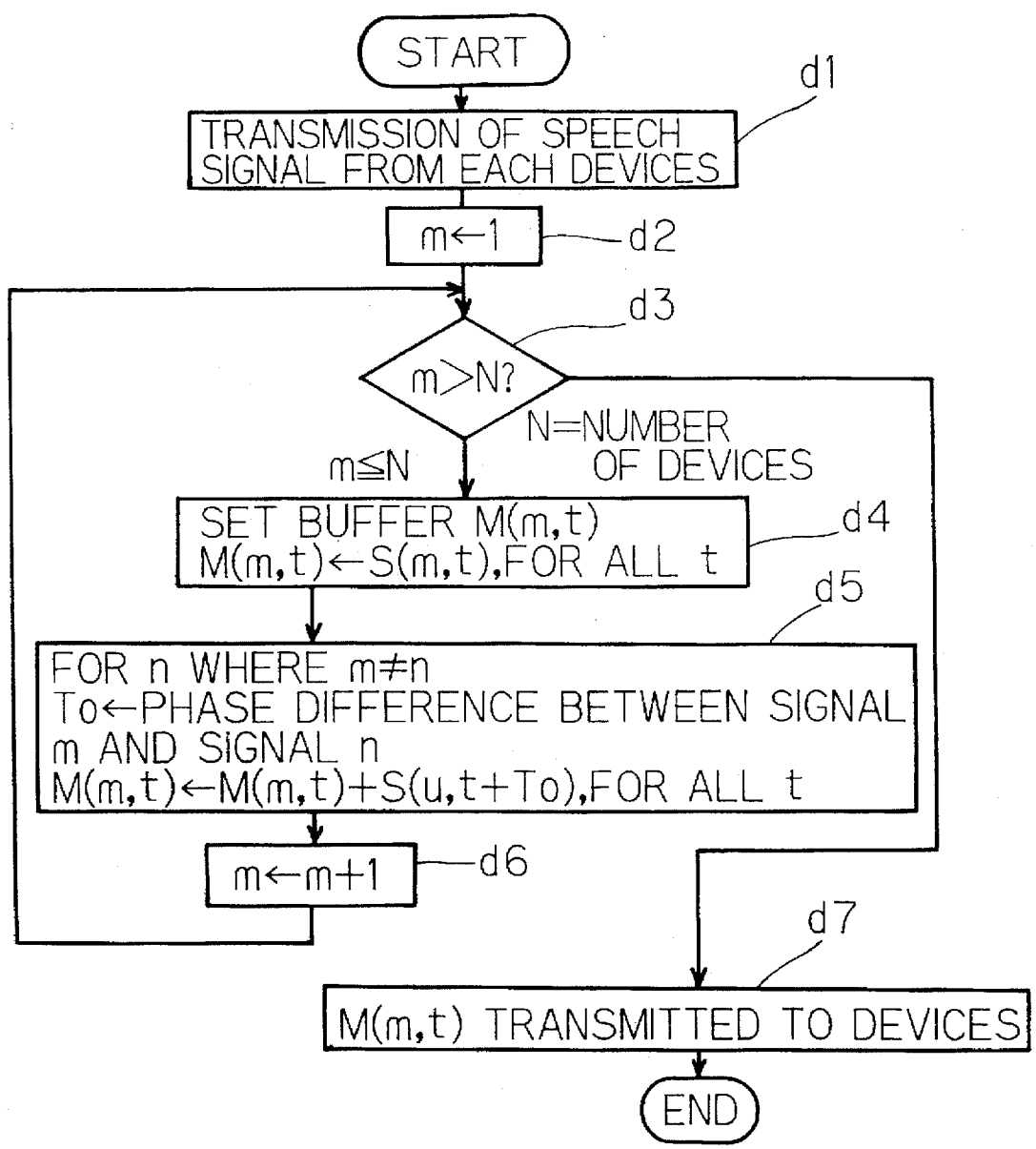
FIG. 30 is a flow chart showing a speech separation recording system.

The processing flow is illustrated in FIG. 30.

(Step d1)

The speech data is recorded at respective communication devices. These data are transmitted to a processing communication device. This processing may be performed at a single communication device or only at the communication device which are desired to have this function by the user. Or the processing may be carried out in all the communication devices. The data thus obtained are added up with the phase of the voice being corrected. As in the layout calculation, the signal of communication device m is assumed to be $S(m, t)$. The voice of the person who is using this communication device m is determined by the following procedure.

(Step d2)

It is assumed that m=1.

(Step d3)

When m>N, the procedure advances to Step d7 and when m≦N, the procedure proceeds to Step d4.

(Step d4)

A record buffer is set to $M(m, t)=S(m, t)$.

(Step d5)

For all cases of n where m≠n, the following equation is calculated.

$$d(m, n, T) = \text{sum}[abs\{S(m, t) - S(n, t+T)\}]$$

Here, sum is an addition operation for a certain length of time (a few m seconds–a few tens of m seconds). Now, by varying T within the range of (1000×Dmn/340±z) m sec., T giving the minimum value of d is determined (here, Dmn is expressed in meters). When z=3, the phase difference can be compensated for with allowance for positional deviations within the range of ±3 m seconds. Depending on the circumstances under which the communication devices are used, ±2 or ±1 m sec. may be used in lieu of ±3 m sec. The determined value of T is taken as To. To may also be found by transforming the wave to zero crossing wave. Moreover, in lieu of city block distance, Euclid distance or any other scale of distance can be used, of course.

The calculation of $M(m, t)=M(m, t)+S(n, t+To)$ is performed for all cases of t. If there is a possibility of overflow, normalization is performed. This processing is carried out for all cases of n (m≠n). In this manner, the speech data of the person using communication device m is prepared.

(Step d6)

With m=m+1, the procedure returns to Step d3. Thus, the calculation is performed for the necessary cases of m.

(Step d7)

$M(m, t)$ is transmitted to all communication devices. The procedure then ends.

In the above manner, a clear voice record emphasizing the speech data of the person using each communication device range can be prepared.

When the minimum value of d within the range of (1000×Dmn/340±3) is not below the threshold in the operation for calculation of phase difference To, the original $S(n, t)$ can be recorded as it is.

In this case, it is possible to happen that a new participant in the conference makes an utterance. However, since the relative positions of microphones are known, the position of the sound source can be estimated by utilizing the layout calculation method. The result of estimation may be notified to those who utilize the minutes of the meeting.

Further, while the signals are added with the inter-device phase differences being corrected in the above example, speech data may be separated by positive subtraction of the voices from other communication devices with the phase differences being positively taken into consideration.

[5]

The stereo recording/playback system is now described.

The means for calculating the topological relationship of communication devices is similar to that described hereinbefore.

Thus, it is assumed that an inter-device distance table as shown in FIG. 24 is already available just as it is the case with record/playback.

Moreover, it is assumed that the actual positions have been established as explained under [1].

The system of reproducing speech data with reality utilizing the position data is now described. As in the case of record/playback, the speech data of the user of each communication device is emphasized and, then, recorded or played back as rearranged in a plurality of channels for playback (in the case of stereo, 2 channels).

Figure 31:
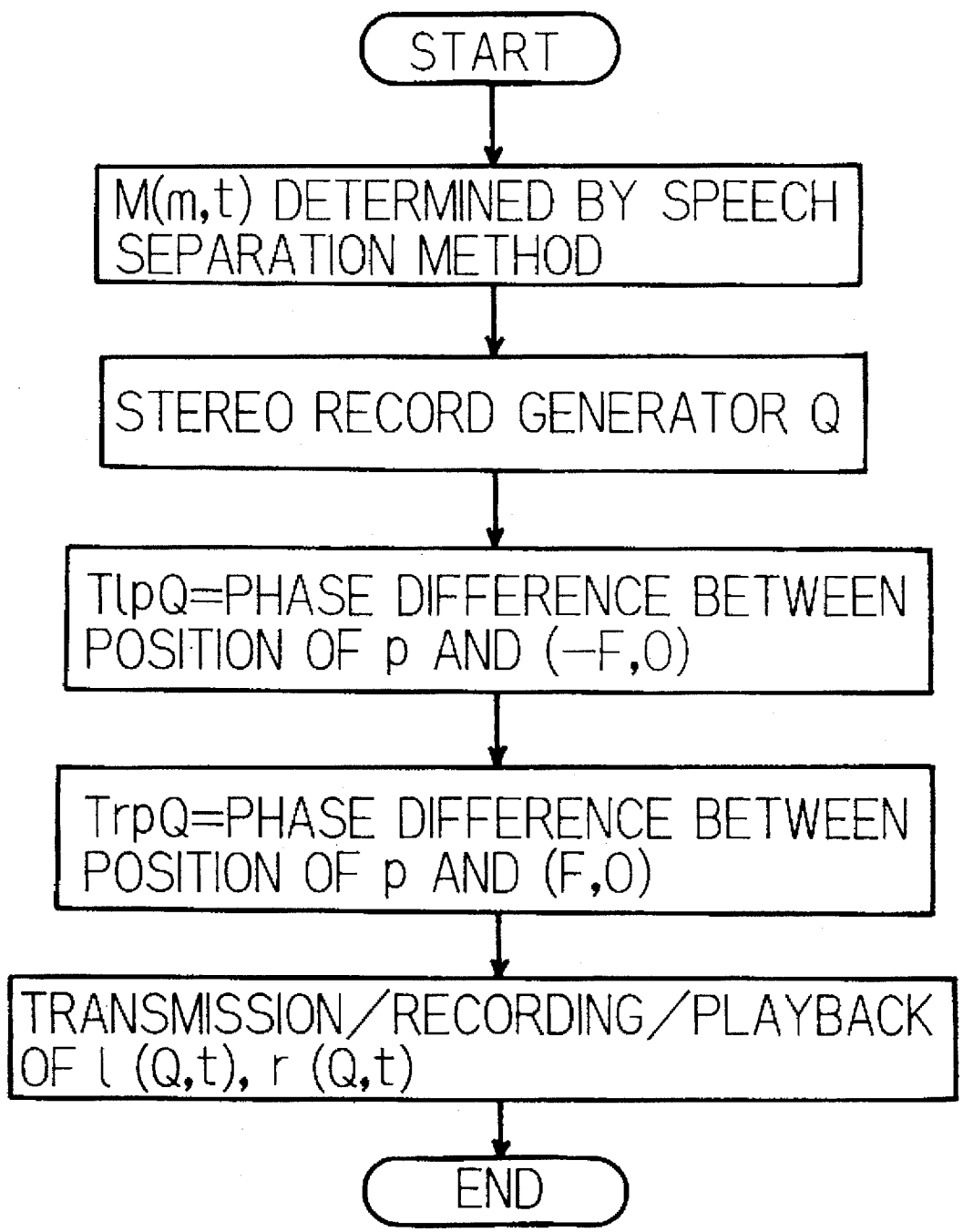
FIG. 31 is a flow chart showing a stereo record/playback system.

The processing flow is shown in FIG. 31.

The speech data of each communication device is subjected to the same processing as the record/playback processing described hereinbefore. Then, with the distance between speakers or earphones for playback being taken as 2F, the laterality is determined by calculating the phase difference from the left position to the right position.

The stereo data can be determined by adding speech data of each communication device with sequential addition of the delay times of speech data reaching from the coordinates of each communication device to the positions of (−F, 0) and (F, 0). This may be carried out when minutes of speech data are prepared or, utilizing the emphasized speech data and the topological relationship of respective communication devices as stored in the memory, can be carried out at playback.

Moreover, in the stage where the actual topological relationship has not been established as yet, that is to say the stage where only the distance relationship has been determined, it is possible to prepare a variety of alternative speech data instead of the descriptive or graphic selection shown in FIG. 26 and have a suitable one selected at playback.

The fifth and sixth Inventions

The communication device according to one embodiment is now described with reference to FIGS. 32–41.

Figure 32:
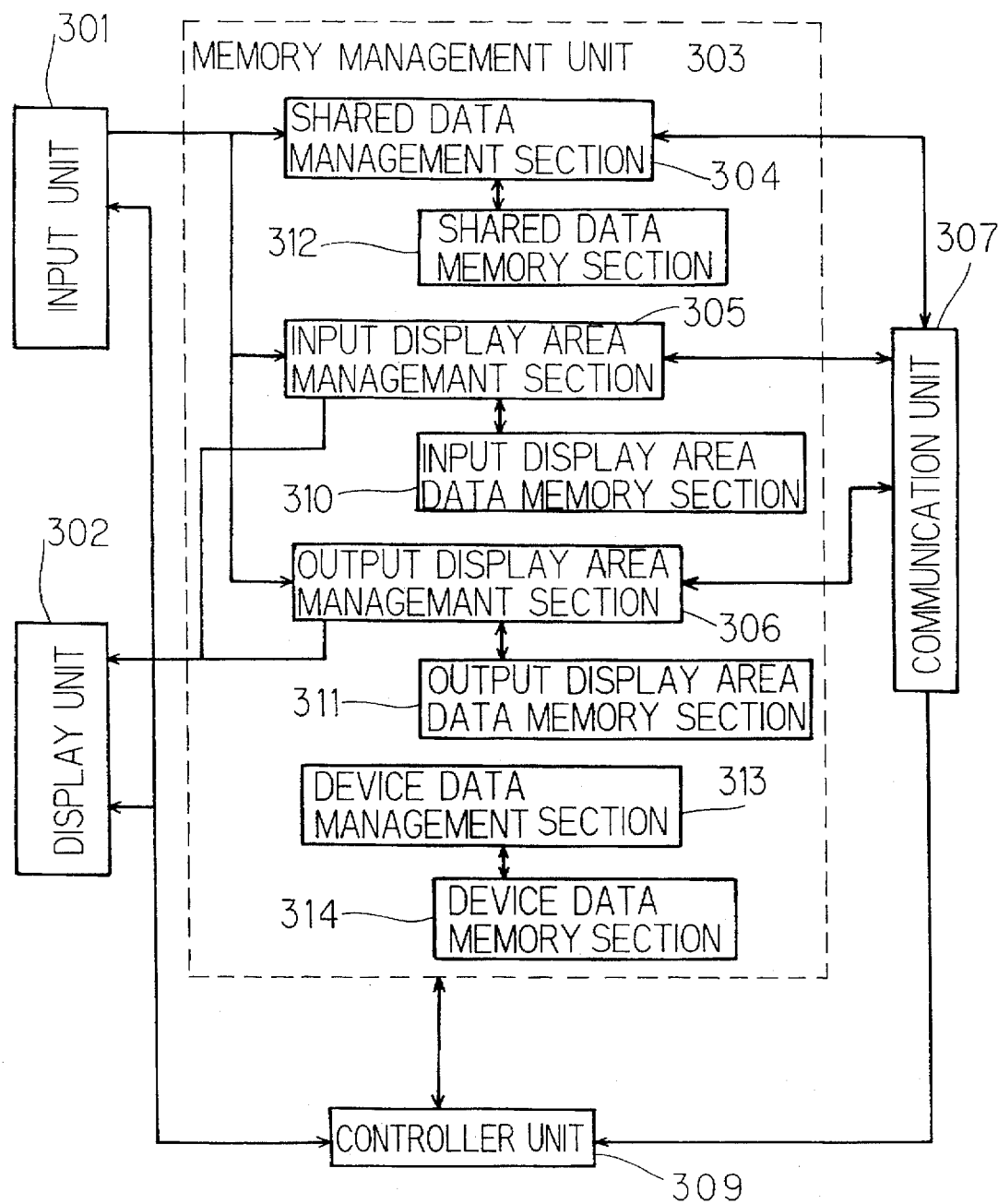
FIG. 32 shows a communication device architecture according to the fifth and sixth inventions.

FIG. 32 shows the architecture of a communication device according to this embodiment.

This communication device comprises an input unit 301, a display unit 302, a memory management unit 303, a communicating unit 307 and a control unit 309. The memory management unit 303 comprises a shared data management section 304, a shared data memory section 312, an input display area management section 305, an input display area data memory section 310, an output display area management section 306, an output display area data memory section 311, a device data management section 313, and a device data memory section 314.

The terms used in the description of the inventions 5 and 6 have the following meanings.

The term "group" means a cluster of mutually communicable communication devices inclusive of the device of its own as connected by a logical communication link which has been described in the description of the first invention.

The terms "user input data" means any input data in terms of cursor, sentence, graph, image or table, inclusive of a designated position where it is displayed.

The term "output display area" means the size and range of data in which any output data in terms of cursor, sentence, graph, image or table can be displayed to the user at the display unit 302.

The term "input display area" means the size and range of data in which any user input data can be displayed to the user at the display unit 302 of the particular communication device.

The input display area and the output display area in any one communication device are physically the same range. For example, when a point (100, 250) in the input display area as pointed with a cursor, the cursor in the output display area is situated at the point (100, 250). The reason why the output display area and the input display area are independently defined is as follows.

Thus, while the user input display areas of respective communication devices are in the physically fixed positional relation as described hereinafter, the output display areas of the respective communication devices are present independently of each other.

The respective blocks are now described.

[Control unit 309, communication unit 307]

The control unit 309 controls the actions of the input unit 301, display unit 302, memory management unit 303, and communication unit 307, and the correlation of these actions. And all communications are made from the communication unit 307.

[Input unit 301]

The input unit 301 is a unit which receives the user input data entered with a keyboard, mouse, pen or the like.

[Display unit 302]

The display unit 302 may for example be a CRT display or a liquid crystal display.

[Device data management section 313, device data memory section 314]

The device data management section 313 connects logical communication link of communication devices, among other functions, and extracts the device data from the device data memory section 314. Thus, this block corresponds to the communication control of the first invention.

[Input display area management section 305, input display area memory section 310]

The input display area management section 305 obtains input area data from the input display area data memory section 310 and, based on this input display area data, judges whether the input data can be accommodated in the user input data display area of the communication device of its own. The judgement is made by querying whether the designated position of the user input data lies within the input display area of the device of its own.

If the user input data is within the input display area, the data is stored in the memory management unit 303, where it is classified into shared data operation data, input display area data operation data, output display area data operation data, and control operation data and fed to the shared data management section 304, input display area management section 305, output display area management section 306, and control unit 309, respectively. Moreover, the user input data is displayed by the display unit 302 in the input display area.

If it is outside the input display area, the user input data is transmitted from the communication unit 307 to other communication devices within the group which have input display area data such that the user input can be accommodated within the input display area.

The input display area data memory section 310 stores input display area data representing the correlation of the input display areas of communication devices within the group, with the input display areas of respective communication devices being adjacently correlated. This relationship can be established independently of the output display area data in the output display area data memory section 311 which is described hereinafter.

Presented in FIG. 33 is an example of input display area data memory section 310, which shows the relationship of the ID numbers of communication devices belonging to a group with the input display area data of the communication devices.

The user input display area data consists of an input display area field and an input display area left top corner field.

The input display area field represents the size of the user input display area and, in the communication device a of FIG. 33, has a size of 640×480 pixels.

The input display area left top corner field represents the correlation, among the input display areas of communication devices belonging to the group, of the coordinates of the input display area left top corner point which is the origin within the input display area. When the space is blank, the coordinates of the left top corner of the input display area is regarded as the origin.

The coordinates of the input display area left top corner of communication device a represent the origin (0, 0).

The coordinates of the left top corner of the user input display area of communication device b are (the x-coordinate of left top corner of device a+x-dimension of user input display area of device a, y-coordinate of left top corner of device a), and when the negative direction of y-axis is assigned to the top side and the positive direction of x-axis to the right-hand side, the user input display area of communication device b is adjoining to the right-hand side of the input display area of communication device a and the input display area of communication device c is adjoining to the top side of the input display area of communication device a.

The other area outside the user input display area is not adjacent to the user input display area of any communication device and any user input in that area is invalidated or null.

FIG. 34 shows the state in which the input display areas of communication devices a, b, and c are arranged in mutually adjacent relationship in the input display area data memory section 310 according to the layout of FIG. 33 and displayed at the display unit 302.

Referring to FIG. 34, a cursor pointing to the current user-designated position is present in the input display area of communication device a. This cursor can be freely moved within said input display area according to user input but when the cursor is moved upwards beyond the top side of the input display area of a, it is deemed to have moved into the user input display area of c so that the cursor is displaced into the display output of communication device c.

Figure 34A:
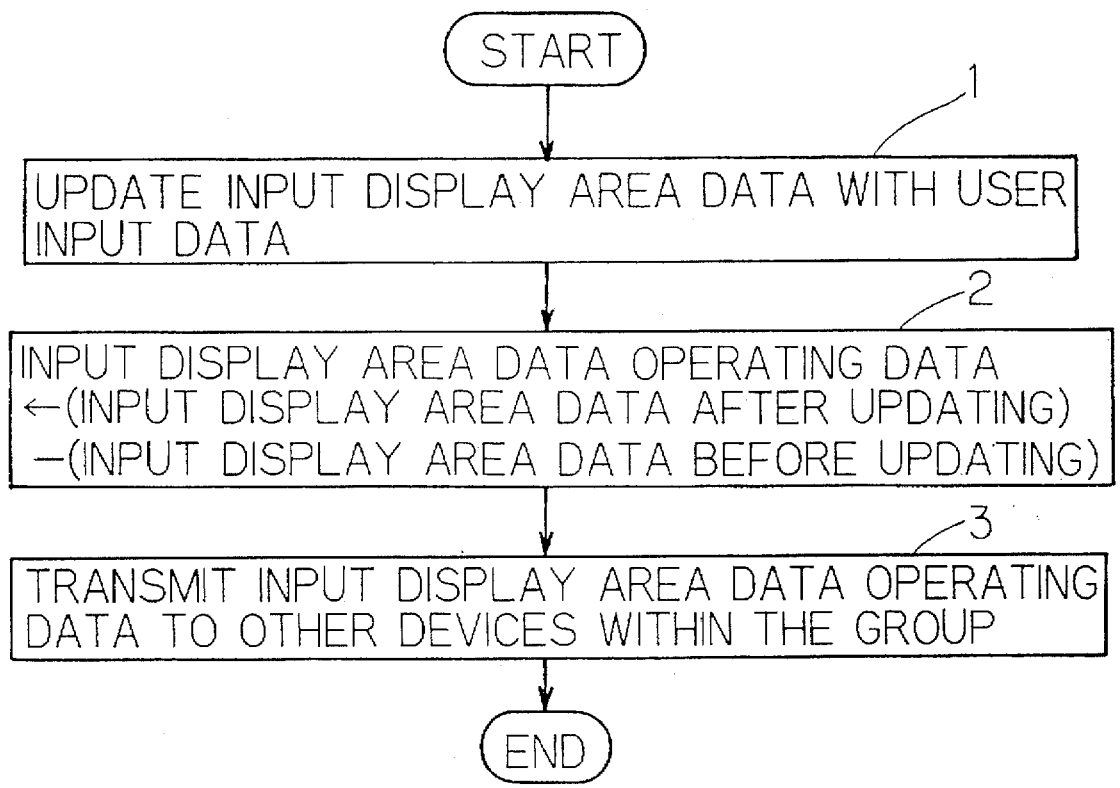
FIGS. 34(a) and 34(b) show a typical allocation of user input display areas according to the data stored in the user input display area data memory.

The input display area management section 306 executes the flow charts of FIG. 34(a) and (b) as well.

Processing on entry of user input data by the user of the device of its own (FIG. 34(a))

1. The input display area data in the input display area data memory section 310 is updated according to user input.

2. As the input display area data operating data which is an updating data of the input display area data in the input display area data memory section 310, the difference between the input display area data before and after updating in the input display area data memory section 310 is used.

3. The input display area data operating data is transmitted in a multiple-address way to the other communication devices within the group.

Figure 34B:
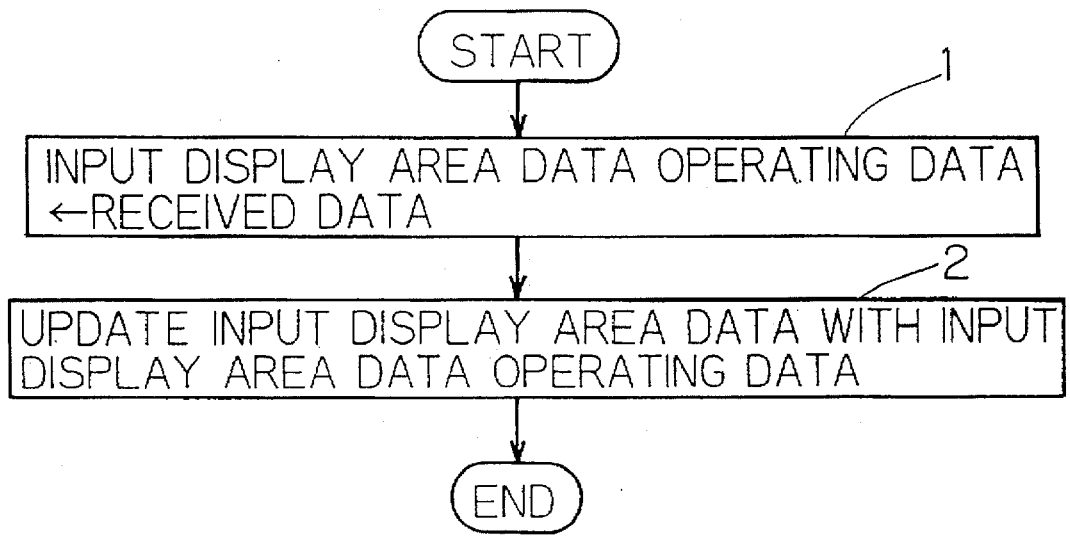

Processing upon reception of user input data from any other communication device within the group (FIG. 34(b))

1. The received data is used as the input display area data operating data.

2. Based on the input display area data operating data, the input display area data in the input display area data memory section 310 is updated.

In this manner, the input display area data in the input display area data memory section 310 which is managed by respective communication devices are assured of uniformity over the plurality of communication devices.

[Output display area management section 306, output display area data memory section 311]

The output display area management section 306 acquires output display area data from the output display area data memory section 311 and, based on the output display area data, determines the expression format thereof and displays the data at the display unit 302. The output data is retrieved from the shared data management section 304.

The output display area data memory section 311 stores the output display area data for a plurality of communication devices, to which reference is made by the display unit 302 of the devices.

Presented in FIG. 36 is an example of output display area data in the output display area data memory section 311, which shows the ID numbers of communication devices, the sizes of output display areas, and the output display area correlation data representing the relationship of the output display area with other communication devices.

The relationship with other output display areas, which is the output display area correlation data, may be as follows.

1. The topographical relationship, such as adjacency, overlap, spacing, etc., of the output display areas of the communication devices in an imaginary output display field covering the output display areas of the respective communication devices.

2. The logical relationship such as the data entitled "the technological plan of Company A in the fiscal year X" versus the data entitled "the technological outlook for the fiscal (X+10) year" or "a list of key words which are used in both information A and information B".

3. The functional relationship such as "device/communication status display only", "device operating menu" and so on. These relationships can be stored in the memory block.

In the example of FIG. 36, the output display area of communication device a is sized 640×480 pixels and the output is "page 25 of document-4".

The output display area of communication device b has the same size as above and the relationship of its output to the output display area of communication device a is "the page following the page which is being referred to by device a of the same document".

The output display area of communication device c is designed to output the "operating menu".

Figure 37:
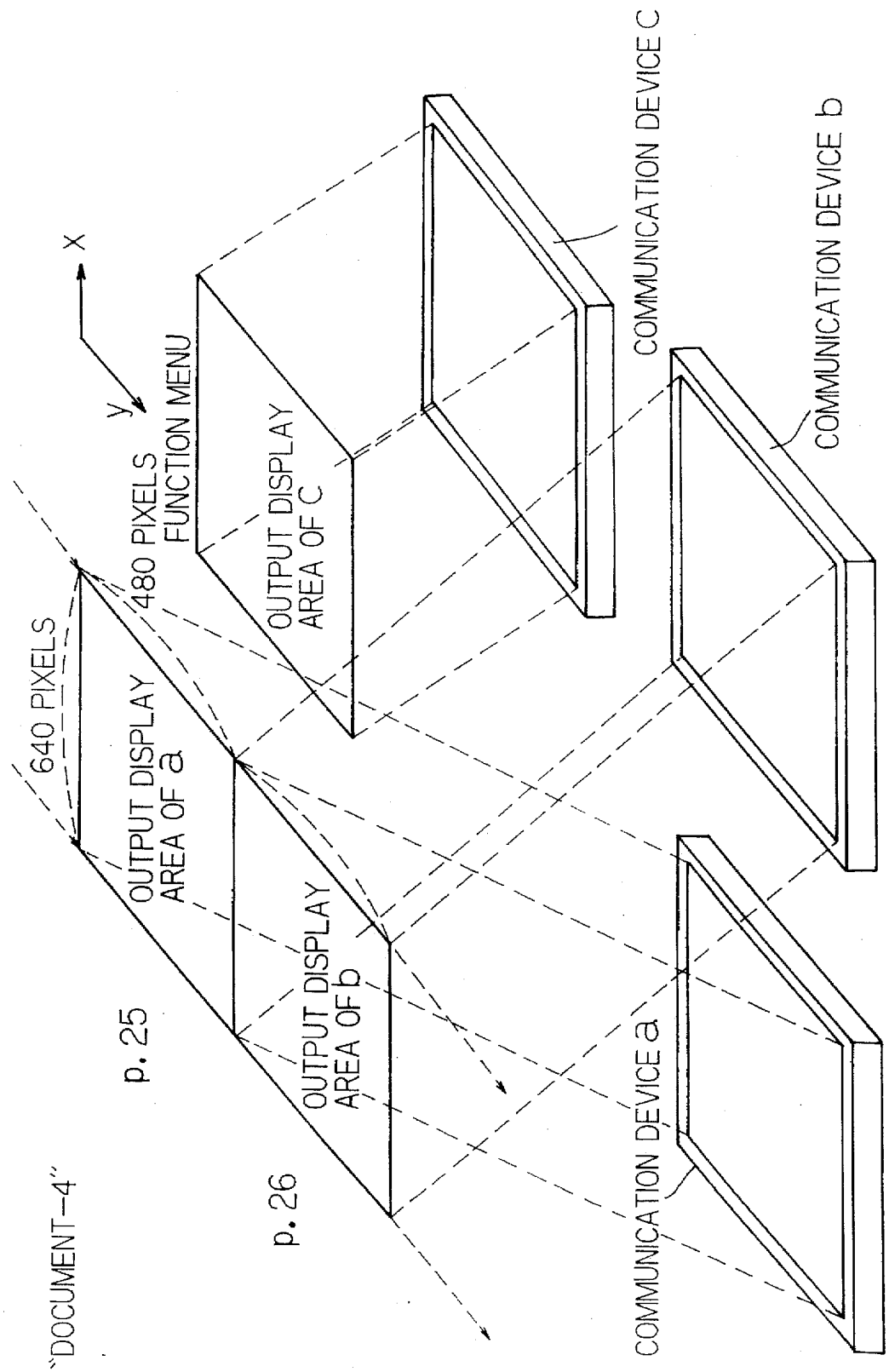
FIG. 37 shows a typical allocation of output display areas according to the data stored in the output display area data memory.

The example of FIG. 37 shows the displays at the display unit 302 of respective communication devices according to the data in the output display area data memory section 311 in FIG. 36. Thus, the screens of the three communication devices a, b, and c are assigned with outputs according to the output display area data in the output display area data memory section 311.

Figure 38A:
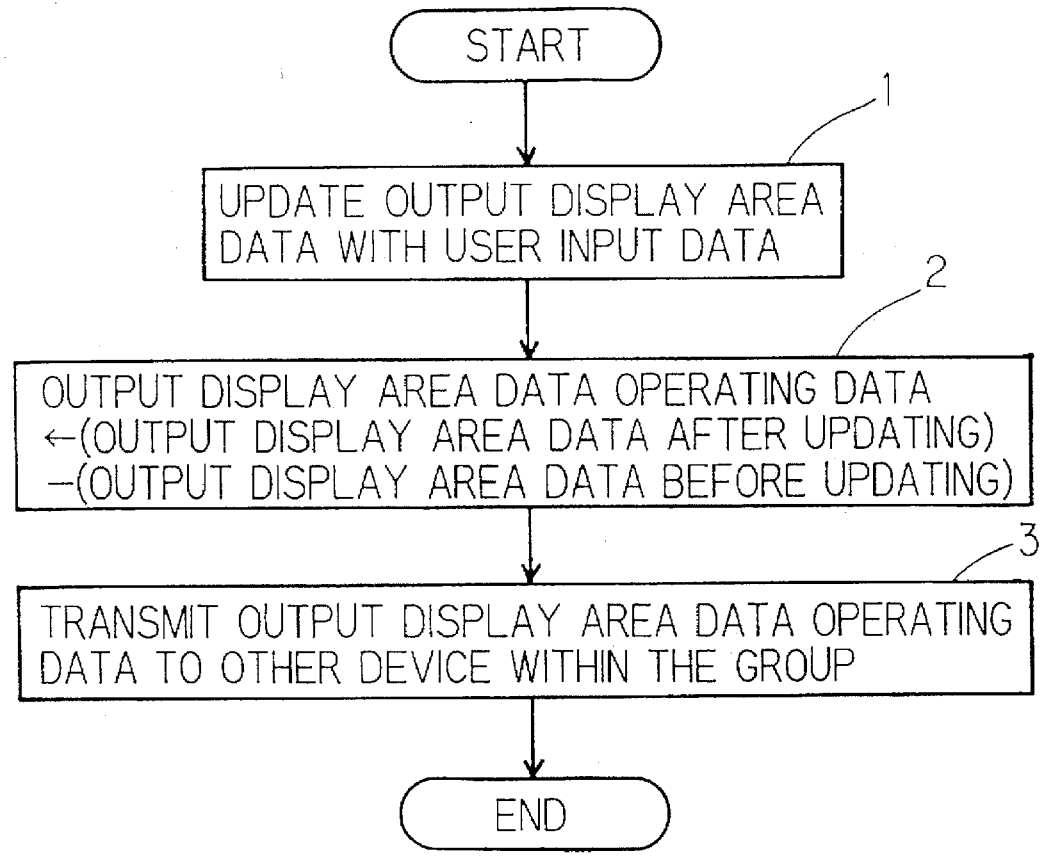
FIG. 38(a) and 38(b) are flow charts of output display area management.

The output display area management section 306 executes the procedures according to the flow charts of FIG. 38(a), (b) as well.

Processing upon entry of data by the user of the device of its own (FIG. 38(a))

1. The output display area data in the output display area data memory section 311 is updated according to the user input data.

2. As the output display area data operating data which is an updating data of the output display area data in the output display area data memory section 311, the difference between the output display area data before and after updating is taken.

3. The output display area data operating data is transmitted to the other communication devices within the group.

Figure 38B:
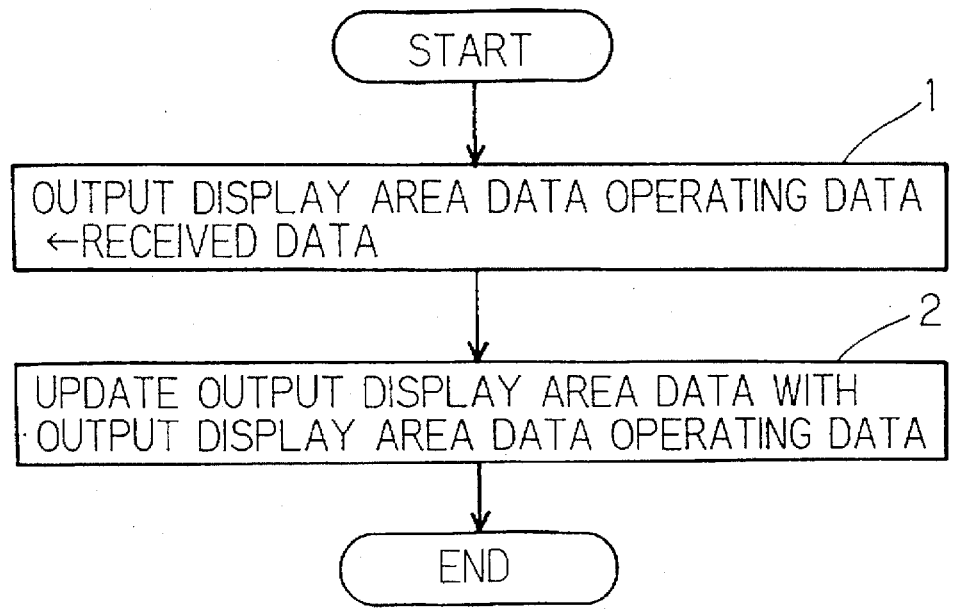

Processing upon reception of data from any other communication device within the group (FIG. 38(b))

1. The received data is used as the output display area data operating data.

2. The output display area data in the output display area data memory section 311 is updated in accordance with the output display area data operating data.

In the above manner, the output display area data in the output display area data memory section 311 managed by the respective communication devices is assured of uniformity over the communication devices.

[Shared data management section 304, shared data memory section 312]

Figure 39A:
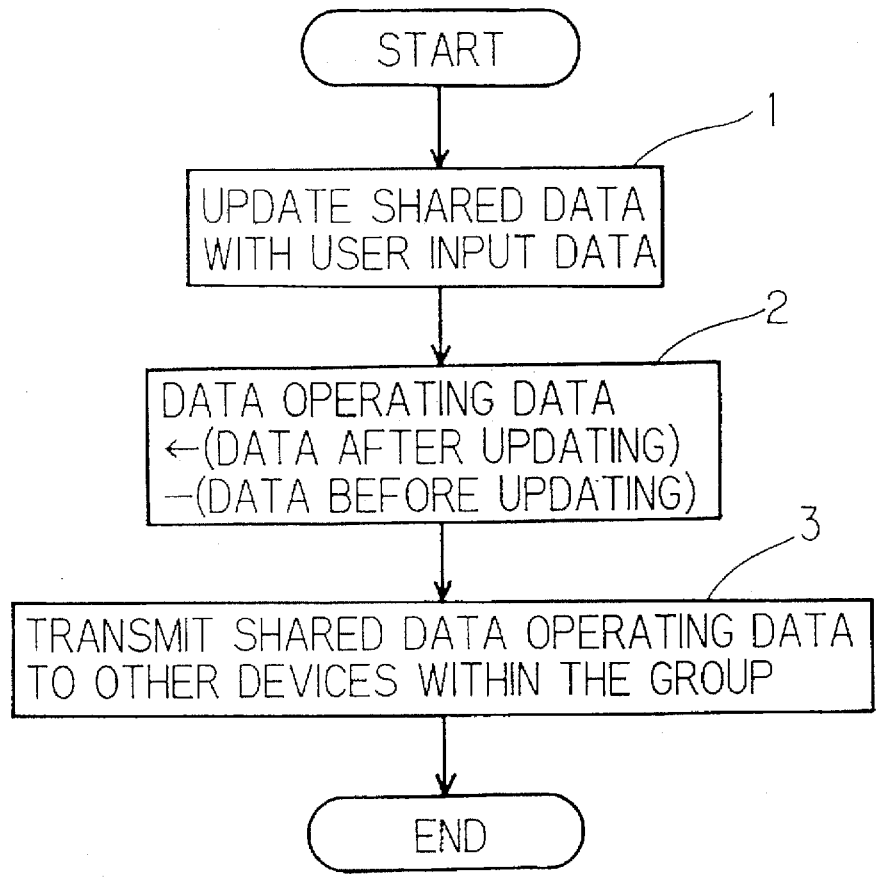
FIG. 39(a) and 39(b) are flow charts of shared data management.

The shared data management section 304 executes the procedure according to the flow charts of FIG. 39(a), (b).

Processing upon entry of data by the user of the device of its own (FIG. 39(a))

1. The shared data in the shared data memory section 312 is updated in accordance with the user input.

2. As the shared data operating data which is an updating data for the shared data in the shared data memory section 312, the difference between shared data before updating and that after updating is used.

3. The shared data operating data is transmitted to the other communication devices within the group.

Figure 39B:
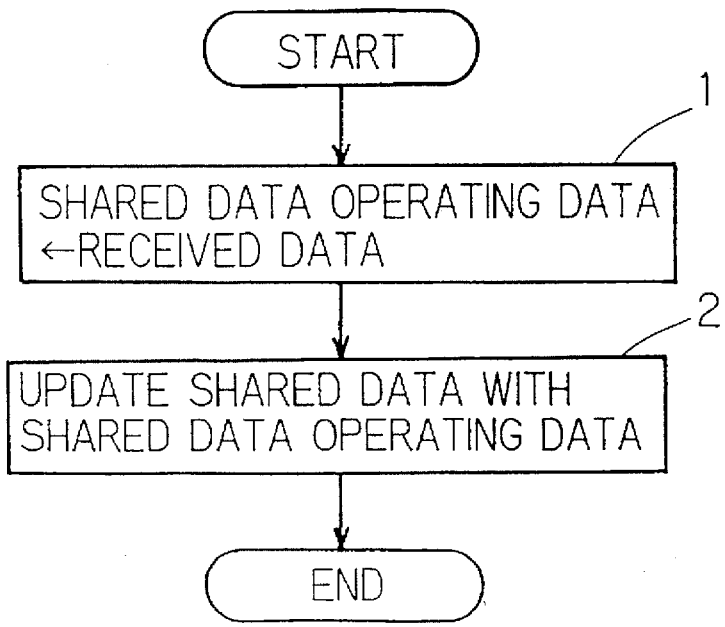

Processing upon reception of data from any other communication device within the group (FIG. 39(b))

1. The received data is taken as the shared data operating data.

2. The shared data in the shared data memory section 312 is updated according to the shared data operating data.

By the above procedure, the uniformity of shared data in the shared data memory section 312 which is managed by respective communication device is insured over a plurality of communication devices.

The architecture and functions of the device of the invention have been described above.

Now, the operation of the device is described with regard to the case in which users perform a collaborative work using shared data among a plurality of communication devices, reference being had to the flow chart of FIG. 40.

(Step m1, grouping)

As the control unit 309 executes the procedure which may be established by user input or be predetermined, a communication channel is established with other communication devices.

(Steps m2, sharing of stored data)

The user makes an entry to distribute the data stored in one communication device through the established communication channel for data sharing. Blank shared data is prepared in each communication device and the difference between the data to be shared and the blank data is entered for shared data into the particular communication device and distributed as shared data operating data to the other communication devices within the group.

(Step m3, setting and updating of output display area data)

The output display area data is set by the user or according to the output display area data operating data from another communication device within the group. In this case, the priority and default setting can be provided. For example, the output display area data and output display area data operating data are set as follows.

(a) User's designation.
(b) Setting according to the output display area data operating data from another communication device.
(c) Default setting as designated by the user beforehand
(d) Default setting of the communication device Thus, the output display area data are set and updated in the order of (a), (b), (c) and (d).

(Step m4, setting and updating of user input display area data)

The input display area data is set by the user or according to the input display area data operating data from another communication device within the group and the priority and default settings can be provided.

For example, the input display area data is set as follows.

(a) User's designation
(b) Setting according to the input display area data operating data from another communication device
(c) The output display area data with definition of positional relationship such as the page of a document is transformed to input display area data by, for example, the following procedure.

(1) Pages of a document are arranged in the increasing order of page numbers from top to down.
(2) Different documents are arranged adjacent to the left side.
(3) The menu and the window for a message are located adjacently to the right side
(4) The vertical arrays are adjusted up and down to align their centers.

It should be understood that the method for transformation of output display area data to input display area data is not limited to the above method.

(d) Default setting as designated by the user beforehand
(e) Default setting of the communication device.

The input display area data is set and updated in the order of (a), (b), (c), and (d).

The procedure of Step m4 (c) is intended and to insure that when the topographic relationship of "sequential pages of a given document" or "a given portion and a portion at its right side of a document" has been set in the output display area data, the input display area data is also set in a similar fashion to insure agreement in display and operation.

By the above procedure, the input display areas and output display areas of the respective communication devices within a group are respectively correlated so that movement of a cursor, inputs and outputs over a plurality of input display areas are made feasible.

(Step m5, operation of shared data, input display area data, and output display area data, and maintenance of consistency within a group)

When the shared data stored in the device of its own is updated by user input, the shared data management section 304 makes it the shared data operating data and transmits to the other communication devices within the group.

The shared data operating data transmitted by another communication device within a group and received by the device of its own for the shared data stored in said another communication device is applied to the shared data stored in the device of its own for updating, a consistency of shared data within the group is insured.

When the input display area data memory section 310 in the device of its own is updated by user input, the input display area management section 305 transmits the change as input display area data operating data to the other communication devices within the group. Moreover, the input display area data operating data for the input display area data memory section 310 stored in another communication device within the group as transmitted by said other communication device and received by the device of its own is applied to the input display area data memory section 310 of the device of its own for updating, the consistency of the input display area data memory sections 310 of the group is insured.

When the output display area data memory section 311 of the device of its own is updated by user input, the output display area management section 306 makes it an output display area data operating data and transmits it to the other communication devices within the group.

As the output display area data operating data for the output display area data memory section 310 stored in another communication device within the group as transmitted by said other communication device and received by the device of its own is applied to the output display area data memory section 311 of the device of its own for updating, the consistency of the output display area data memory sections 311 of the group as a whole can be insured.

Modification 1

In the recent communication devices, a multiwindow system such that one output display area is divided into a plurality of output areas called windows to enable different user outputs in the respective output areas is frequently employed.

The input display area data and output display area data can be assigned to the windows of the above type of communication device and the input display area data and output display area data assigned to the windows can be maintained in a definite relation.

Figure 41:
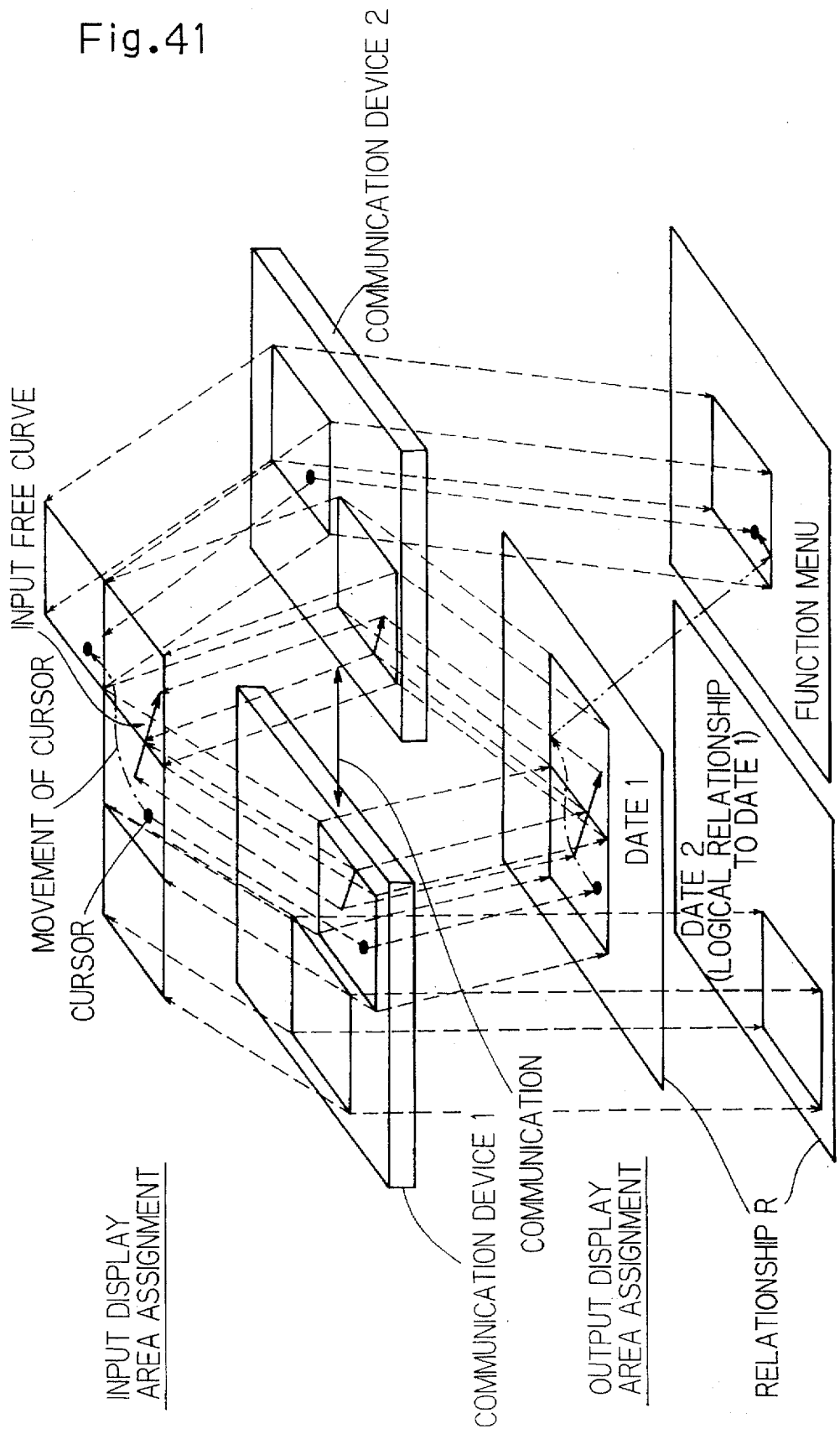
FIG. 41 shows the typical allocations of input display areas and user output display areas in Modification 1.

FIG. 41 shows an assignment of input display area and output display area in this modification. Compared with FIGS. 34 and 37, the device-to-device correlation of input and output positions has changed to the window-to-window correlation of input and output positions.

Modification 2

In the above communication device, the input display area data memory section 310 and output display area data memory section 311 are previously set by the user or the system. However, by equipping the communication device with a contact or non-contact sensor means for detecting the physical relationship of input display areas and setting the thus-detected device-to-device relation of input position in the input display area data memory section 310 and output display area data memory section 311, "sequential pages of a document" can be displayed and processed.

Modification 3

The above communication device with the same input display area and output display area settings which further comprises a couple of operating modes, one of which is such that where the user output in the input display area and output display area are scrollable, the position of the cursor displaced out of the input display area can be accommodated within the input display area by shifting the cursor into the input display area of another device which is topographically adjacent or by updating the user input position of the device by scrolling the user output in the input display area and output display area and a means for switching the operation mode according to user input.

Modification 4

In the data processing system described above, the shared data, input display area data and output display area data are held and managed by respective communication devices. However, the system can be applied to the case in which one or more specified communication devices act as service providing devices and manage one, a combination of two, or all of the shared data, input display area data and output display area in a concentrated manner and the input and output of each communication device is made by reference to these data stored in the service providing devices.

What is claimed is:

1. A communication device comprising:

communication means for communicating with a plurality of other communication devices, service request data detection means for detecting a first service request data transmitted from at least one of said plurality of other communication devices through said communication means and for indicating data for requesting remaining communication devices other than the at least one communication device to perform certain processing on behalf thereof, judging means which does, upon detection of said first service request data by said service request data detection means, judge whether conditions are met for providing a first service as indicated by said first service request data and being the service to process on behalf, selection data communicating means which does, when said judging means has judged that the provision of said first service is possible, transmit data for selecting a communication device which is to provide said first service from among the communication devices at least satisfying the condition for providing said first service as indicated by said detected first service request data excepting the communication device which has transmitted said first service request data, and deciding means which does, according to the data for selecting said communication device, decides the communication device which provides said first service.

2. A communication device comprising:

communication means for communicating with a plurality of other communication devices, service request data detection means for detecting a first service request data transmitted from at least one of said plurality of other communication devices through said communication means and indicating data for requesting remaining communication devices other than the at least one communication device to perform certain processing on its behalf, judging means which, upon detection of said first service request data by said service request data detection means, judges whether conditions are met for providing a first service as indicated by said first service request data as the first service being the service to process on behalf, selection data communicating means which, when said judging means has judged that the provision of said first service is possible, transmits data for selecting a communication device which is to provide said first service from among the communication devices at least satisfying the condition for providing said first service as indicated by said detected service request data excepting the communication device which has transmitted said first service request data, deciding means which, according to said data for selecting a communication device, decides the communication device which provides said first service, and a service request data transmitting means which generates a second service request data representing data for requesting remaining communication devices other than a self communication device to perform certain processing on its behalf and transmits said second service request data to said plurality of other communication devices through said communication means.

3. A communication device comprising:

communication means for communicating with a plurality of other communication devices, service request data transmitting means for generating a first service request data representing a data for requesting remaining communication devices other than a self communication device to perform certain processing on its behalf and transmits said first service request data to said plurality of other communication devices through said transmitting means, service providability data detecting means which detects a first service providability data representing the feasibility of providing the first service being the service to perform on behalf as transmitted from any of said plurality of other communication devices through said communications means, and selection means for selecting a communication device for providing said first service according to the first service request from among the communication devices meeting the conditions for provision of said first service as indicated by the first service providability data detected by said service providability data detecting means.

4. A communication device comprising:

communication means for communicating with a plurality of other communication devices, a service request data transmitting means for generating a first service request data representing a data for requesting remaining communication devices other than a self communication device to perform certain processing on its behalf and transmits said first service request data to said plurality of other communication devices through said transmitting means, service providability data detecting means for detecting a first service providability data representing the feasibility of providing the first service being the service to process on behalf as transmitted from any of said plurality of other communication devices through said communication means, selection means for selecting a communication device for providing said first service from among the communication devices meeting the condition for provision of said first service as indicated by the first service providability data detected by said service providability data detecting means, service request data detecting means for detecting a second service request data transmitted from at least one communication device of said plurality of other communication devices through said communication means and being data indicating data for requesting remaining communication devices other than said at least one communication device to perform certain processing on its behalf, judging means for judging whether the feasibility condition is met for providing the second service being the service to process on behalf and indicated by the second service request data detected by said service request data detecting means, and service providability data transmitting means for, upon judgment by said judging means that the provision of said second service is feasible, transmit a second service providability data indicating that the provision of said second service is feasible.

5. The communication device according to claim 4 wherein said first service providability data or said second service providability data contains data indicating the condition of provision of said first or second service.

6. The communication device according to claim 2 or 4 wherein said first service request data or said second service request data contains a condition data indicating the condition of receiving said first service or second service.

7. The communication device according to at least one of claims 1 through 4 wherein said communication means establishes a communication link between said service-requesting communication device and said service-providing communication device for rendering the devices mutually communicable and implements the relevant service utilizing said communication link.

8. The communication device according to at least one of claims 1 through 4 wherein said communication means is adapted to detect communication devices which are communicable with the device of its own, designate an optional number of devices from among all the detected communicable devices as a group, establish a group communication link for mutual communication only with the communication devices within the group, and communicate service request data utilizing said group communication link.

9. The communication device according to any one of claims 1 through 4, wherein the processing of performing on-behalf processing is a processing impossible for said communication device to perform therein, or a processing more suitably performed by the other communication devices while said communication device remains executable.

10. The communication device according to any one of claims 1 through 4, wherein the processing of performing on-behalf processing is at least one of a shared data control processing, a "Kana-Kanji" conversion processing, dictionary providing processing, voice recognition processing, translation processing, voice output processing, and printer output processing.

11. The communication device according to claim 3, wherein said first service providability data contains a provision condition data being a criterion for use in providing said first service.

12. The communication device according to claim 1 or 3, wherein said first service providability data contains a request condition data being a criterion for use in receiving this first service.

* * * * *